(12) United States Patent
Takacs et al.

(10) Patent No.: US 11,725,098 B2
(45) Date of Patent: Aug. 15, 2023

(54) THERMOPLASTIC VULCANIZATE CONDUITS FOR TRANSPORTING HYDROCARBON FLUIDS

(71) Applicant: Celanese International Corporation, Irving, TX (US)

(72) Inventors: Andrew Takacs, Houston, TX (US); Declan Noel Whelan, Rugby (GB); Antonios K. Doufas, Houston, TX (US); Deborah Jean Davis, League City, TX (US); Robert Leslie Chidlow, Shropshire (GB); Wanli Wang, Katy, TX (US); Krishnan Anantha Narayana Iyer, Pearland, TX (US); Krassimir Iordanov Doynov, Houston, TX (US); Xin Chen, Shanghai (CN); Yuan-Ju Chen, Houston, TX (US)

(73) Assignee: Celanese International Corporation, Irving, TX (US)

( * ) Notice: Subject to any disclaimer, the term of this patent is extended or adjusted under 35 U.S.C. 154(b) by 127 days.

(21) Appl. No.: 16/955,439

(22) PCT Filed: Sep. 14, 2018

(86) PCT No.: PCT/US2018/051022
§ 371 (c)(1),
(2) Date: Jun. 18, 2020

(87) PCT Pub. No.: WO2019/125547
PCT Pub. Date: Jun. 27, 2019

(65) Prior Publication Data
US 2020/0347209 A1 Nov. 5, 2020

Related U.S. Application Data

(60) Provisional application No. 62/607,191, filed on Dec. 18, 2017.

(30) Foreign Application Priority Data

Mar. 19, 2018 (EP) .................................. 18162489

(51) Int. Cl.
*F16L 11/08* (2006.01)
*C08L 23/20* (2006.01)
(Continued)

(52) U.S. Cl.
CPC ............... *C08L 15/02* (2013.01); *C08L 23/12* (2013.01); *F16L 11/082* (2013.01);
(Continued)

(58) Field of Classification Search
None
See application file for complete search history.

(56) References Cited

U.S. PATENT DOCUMENTS 2,972,600 A 2/1961 Braidwood et al.
3,287,440 A 11/1966 Giller et al.
(Continued)

FOREIGN PATENT DOCUMENTS

CN 104910450 9/2015
GB 2473357 A 3/2011
(Continued)

OTHER PUBLICATIONS

Ellul et al.
(Continued)

*Primary Examiner* — Richard A Huhn
(74) *Attorney, Agent, or Firm* — Dority & Manning, P.A.

(57) ABSTRACT

A conduit, particularly flexible conduit comprises an inner tubular housing, at least one reinforcing layer at least partially disposed around the inner housing, an outer protective sheath at least partially disposed around the at least one reinforcing layer, and optionally a thermally insulating
(Continued)

layer disposed between the at least one reinforcing layer and the outer protective sheath. At least one of the outer protective sheath and the thermally insulating layer comprises a thermoplastic vulcanizate composition.

25 Claims, 2 Drawing Sheets

(51) Int. Cl.
    *C08L 15/02*     (2006.01)
    *C08L 23/12*     (2006.01)
    *F16L 59/153*     (2006.01)
    *C08L 23/28*     (2006.01)
    *C08L 23/22*     (2006.01)

(52) U.S. Cl.
    CPC ............ *F16L 59/153* (2013.01); *C08L 23/22* (2013.01); *C08L 23/283* (2013.01); *C08L 2203/18* (2013.01); *C08L 2205/035* (2013.01); *F16L 11/083* (2013.01)

(56) References Cited

U.S. PATENT DOCUMENTS

| | | |
|---|---|---|
| 3,687,169 A | 8/1972 | Reynard |
| 4,130,534 A | 12/1978 | Coran et al. |
| 4,311,628 A | 1/1982 | Abdou-Sabet et al. |
| 4,355,139 A | 10/1982 | Coran et al. |
| 4,540,753 A | 9/1985 | Cozewith et al. |
| 4,639,487 A | 1/1987 | Hazelton et al. |
| 5,013,793 A | 5/1991 | Wang et al. |
| 5,021,500 A | 6/1991 | Puydak et al. |
| 5,028,662 A | 7/1991 | Sezaki et al. |
| 5,073,597 A | 12/1991 | Puydak et al. |
| 5,081,179 A | 1/1992 | Sezaki et al. |
| 5,100,947 A | 3/1992 | Puydak et al. |
| 5,157,081 A | 10/1992 | Puydak et al. |
| 5,177,147 A | 1/1993 | Spenadel et al. |
| 5,936,028 A | 8/1999 | Medsker et al. |
| 5,952,425 A | 9/1999 | Medsker et al. |
| 6,084,031 A | 7/2000 | Medskar et al. |
| 6,123,114 A | 9/2000 | Seguin et al. |
| 6,147,160 A | 11/2000 | Wang et al. |
| 6,255,389 B1 | 7/2001 | Ouhadi et al. |
| 6,342,565 B1 | 1/2002 | Cheng et al. |
| 6,346,571 B1 | 2/2002 | Dharmarajan et al. |
| 6,437,030 B1 | 8/2002 | Coran et al. |
| 6,451,915 B1 | 9/2002 | Ellul et al. |
| 6,668,866 B2 | 12/2003 | Glejbol et al. |
| 6,679,298 B2 | 1/2004 | Espinasse |
| 6,867,260 B2 | 3/2005 | Datta et al. |
| 6,910,507 B2 | 6/2005 | Simon et al. |
| 7,196,137 B2 | 3/2007 | McBride et al. |
| 7,951,871 B2 | 5/2011 | Blok et al. |
| 8,021,730 B2 | 9/2011 | Tsou et al. |
| 8,207,270 B2 | 6/2012 | Kerstetter, III et al. |
| 8,689,846 B2 | 4/2014 | Jones et al. |
| 9,090,019 B2 | 7/2015 | Sheldrake |
| 9,453,093 B2 | 9/2016 | Meka et al. |
| 9,464,178 B2 | 10/2016 | Abubakar et al. |
| 2006/0014903 A1* | 1/2006 | Vromman ............ C08K 5/0083 525/192 |
| 2006/0116474 A1 | 6/2006 | Jarus et al. |
| 2007/0112139 A1 | 5/2007 | Ellul et al. |
| 2007/0254971 A1 | 11/2007 | De Vogel et al. |
| 2007/0282073 A1 | 12/2007 | Weng et al. |
| 2007/0299160 A1 | 12/2007 | Delanaye et al. |
| 2009/0270545 A1 | 10/2009 | Sahnoune et al. |
| 2009/0291305 A1 | 11/2009 | Ommundsen et al. |
| 2011/0120583 A1 | 5/2011 | Coutarel et al. |
| 2015/0041118 A1 | 2/2015 | Chalumeau |
| 2016/0123504 A1 | 5/2016 | Pasquier et al. |
| 2017/0184246 A1 | 6/2017 | Espinasse et al. |
| 2018/0016414 A1 | 1/2018 | Pehlert et al. |
| 2018/0051160 A1 | 2/2018 | Pehlert et al. |
| 2018/0320803 A1 | 11/2018 | Procida et al. |

FOREIGN PATENT DOCUMENTS

| | | |
|---|---|---|
| GB | 2572120 A | 9/2019 |
| WO | WO2009002653 A1 | 12/2008 |
| WO | WO2009078854 A1 | 6/2009 |
| WO | 2009/141538 | 11/2009 |
| WO | WO2014020052 A1 | 2/2014 |
| WO | 2020/055704 | 3/2020 |
| WO | 2020/055709 | 3/2020 |

OTHER PUBLICATIONS

Ver Strate et al., "Near Monodisperse Ethylene-Propylene Copolymers by Direct Ziegler-Natta Polymerization. Preparation, Characterization, Properties", Macromolecules, 1988, vol. 21, pp. 3360-3371.

International Search Report and Written Opinion of PCT/US2018/051022, dated Feb. 14, 2019.

* cited by examiner

THERMOPLASTIC VULCANIZATE CONDUITS FOR TRANSPORTING HYDROCARBON FLUIDS

CROSS-REFERENCE OF RELATED APPLICATIONS

This application is a National Phase Application claiming priority to PCT Application Serial No. PCT/US2018/051022, filed Sep. 14, 2018, which claims priority to and the benefit of U.S. Provisional Application No. 62/607,191, filed Dec. 18, 2017 and EP 18162489.1, filed Mar. 19, 2018, the disclosures of which are hereby incorporated by reference in their entirety.

FIELD

This present disclosure relates to conduits for transporting hydrocarbon fluids and particularly, but not exclusively, hydrocarbon fluids from oil and gas production facilities.

BACKGROUND

Flexible and metal conduits (e.g., risers, pipes, flow lines, tubes, hoses and the like) used in the recovery of oil and gas resources are typically composites of a number of polymeric and metal components. For example, a typical flexible conduit/pipe for use in oil and gas production comprises an internal impermeable pressure sheath through which the hydrocarbons flow. The pressure sheath is composed of a polymeric tube, which is surrounded by one or more layers of helically-wound armoring wires, generally made of metal, and then by a polymeric external protective layer. For example, conduits of this type are manufactured in lengths of up to 10 km and typically have an external diameter greater than 100 mm.

The polymeric components of conduits used in oil and gas production must, depending on their particular application, exhibit resistance to fluid exposure, chemical reactivity (e.g., strength of protection against chemical attack or solvent reaction), heat transfer, abrasion, and aging as well as meet the physical demands of the pressures, temperatures and mechanical stresses of the chemically challenging environments of these applications. Present day thermoplastic materials, for example polyolefins, polyamides, engineering thermoplastics (e.g., PVDF), and syntactic foam, which is commonly used, can have limitations in these aspects. There is, therefore, interest in developing new polymeric materials for application in flexible and metal (e.g., steel) pipe conduits for transporting hydrocarbon fluids.

For example, U.S. Patent Application Publication No. 2006/0014903 discloses a flexible conduit, comprising: an inner housing having a channel formed therethrough; at least one tensile layer at least partially disposed about the inner housing; and a thermoplastic vulcanizate composition at least partially disposed about the at least one tensile layer, the thermoplastic vulcanizate composition comprising: a dispersed, at least partially vulcanized rubber component; a thermoplastic component; and a nucleating agent, wherein the thermoplastic vulcanizate composition has a Shore A hardness of at least 60 and a Shore D hardness less than 50; and wherein the thermoplastic vulcanizate composition has a wall thickness of at least 5 mm.

In addition to the demands imposed on all conduits, flexible and metal, for transporting hydrocarbon fluids, the increasing reliance on deep and ultra-deep water production environments, where ocean floor temperatures can be very low, leads to the added problem that cooling of production fluids can lead to pipe blockage. For example, when transporting crude oil, blockage of the internal bore of a conduit can occur due to wax formation. As a method to overcome such problems, it has in the past been suggested that a layer of thermal insulation should be provided around the fluid retaining layer of a pipe to insulate the inner bore of the pipe from external low temperatures and thereby help prevent blockage. However, the insulating effects provided to date have been limited.

For example, one known technique for providing a thermal insulation layer is to wind tape manufactured from a thermally insulating material helically around an underlying layer during manufacture of the conduit body (e.g., pipe body). In particular, a tape formed from a polypropylene matrix filled with hollow glass spheres has been used since this has been reported to provide a low thermal conductivity (k) value and the ability to withstand reasonably high hydrostatic pressures. See "Syntactic Foam Thermal Insulation for Ultra-Deepwater Oil and Gas Pipelines", L. Watkins and E. Hershey, Offshore Technology Conference (2001). However, the hollow glass spheres in the tape are prone to crushing and internal and external pressures operate to squeeze the tape layer thereby reducing its thickness and thus its thermal insulation properties. Again, therefore there is interest in providing improved thermal insulation layers for conduits used to transport hydrocarbon fluids, particularly at extreme temperatures (e.g., low ocean floor temperatures).

SUMMARY

This present disclosure relates to conduits, particularly flexible conduits, for transporting hydrocarbon fluids and particularly, but not exclusively, hydrocarbon fluids from oil and gas production facilities. It has been surprisingly found that certain specific thermoplastic vulcanizate (TPV) compositions exhibit excellent properties for use as a thermally insulating layer, including where such layer additionally acts as an external protective layer or outer sheath, of conduits for transporting hydrocarbon fluids.

In an embodiment, disclosed herein is a flexible conduit comprising (a) an inner housing; (b) at least one reinforcing layer at least partially disposed around the inner housing; (c) an outer protective sheath at least partially disposed around the at least one reinforcing layer; and (d) a thermally insulating layer disposed between the at least one reinforcing layer and the outer protective sheath, wherein the thermally insulating layer comprises a thermoplastic vulcanizate composition comprising: (i) a dispersed phase of an at least partially cured rubber comprising repeating units derived from at least one $C_4$ to $C_7$ isomonoolefin monomer and (ii) a continuous phase including at least one thermoplastic polymer. The conduit/pipe structure may have a wide range of flexibility (e.g., from more flexible to more rigid) depending on the application of interest. By changing the relative amounts of rubber and thermoplastic polymer and/or plasticizer type and amount in the TPV composition, the degree of flexibility of the conduit can be tailored.

In an embodiment, disclosed herein is a (flexible) conduit comprising (a) an inner housing; (b) at least one reinforcing layer at least partially disposed around the inner housing; and (c) an outer protective sheath at least partially disposed around the at least one reinforcing layer, wherein the outer protective sheath comprises a thermoplastic vulcanizate composition comprising: (i) a dispersed phase of a rubber component that has been at least partially cured with a curative and (ii) a continuous phase of a thermoplastic component.

DETAILED DESCRIPTION OF THE EMBODIMENTS

Figure 1:
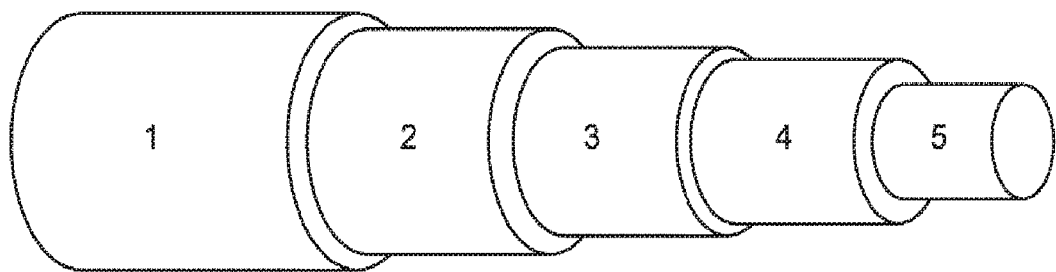
FIG. 1 is a cross-sectional view of a conduit according to one or more embodiments of the present disclosure.

This present disclosure relates to conduits for transporting hydrocarbon fluids (and associated fluids) and particularly, but not exclusively, hydrocarbon fluids from oil and gas production facilities. Such conduits may be used, for example, for transporting fluids between oil and gas reservoirs and offshore platforms for separation of oil, gas, and water components. It has been found that certain specific thermoplastic vulcanizate (TPV) compositions exhibit excellent properties for use as a thermally insulating layer, including where such layer additionally acts as an external protective layer or outer sheath, of conduits for transporting hydrocarbon fluids.

In the present disclosure, the terms "conduits," "pipes," "hoses," "tubes," and the like may be used interchangeably. Additionally, the terms "housing," "sheath," and "layer" may be used interchangeably in the practice of the present invention. The conduits described herein comprise at least an inner tubular housing which, in use, is in contact with the hydrocarbon fluids being transported, at least one reinforcing layer at least partially disposed around the inner housing and an outer protective sheath at least partially disposed around the at least one reinforcing layer. The various layers of such conduits are required to have different and exacting properties and, depending on these properties, are currently formed of a number of polymeric and metal components.

The inner tubular housing provides a channel for the flow of hydrocarbon fluids (e.g., oil and/or gas, and other fluids mixed therewith such as water, production fluids, and the like), and accordingly must exhibit particular qualities including, for instance, gas impermeability and chemical resistance. In some instances, the inner tubing housing provides a flexible property of a flexible conduit and may be collapsible in a given direction under the action of external pressure greater than the internal pressure of the conduit. The reinforcing layer provides the structure and integrity of the conduit, to take up pressure applied to the conduit, without causing irreversible damage to the conduit. That is, the reinforcing layer imparts strength to the conduit, and may be composed, for example, one or more lamina or layers of a metal, a reinforced polymer (e.g., carbon nanotube reinforced polyvinylidene fluoride (PVDF)), and the like, and combinations thereof. Examples of internal tubular housings and reinforcing layers are described in U.S. Pat. Nos. 6,679,298; 6,123,114; 3,687,169; and 9,090,019, incorporated herein by reference in their entirety. The outer protective sheath (or simply "outer sheath") provides protection against the external environment, such as against abrasion and fatigue placed upon to conduit. The outer protective sheath may be composed of a polymeric material that accordingly imparts abrasion resistance and fatigue resistance, among other qualities, to the conduit.

Other layers may additionally form portions of the conduit, as described hereinbelow in greater detail, and each of the layers may be composed or have adjacent thereto a polymeric component. Accordingly, these polymeric components must exhibit resistance to fluid exposure, chemical reactivity, heat transfer, abrasion, and aging as well as meet the physical demands of the pressures, temperatures, and mechanical stresses of chemically challenging environments. Polymeric components imparting thermal insulation are of particular importance for inclusion in such conduits. Failing to properly thermally insulate a conduit, particularly those for use at extreme temperatures, may allow the formation of hydrate plugs (i.e., crystalline solids) that can restrict flow within the conduit, damage equipment, and potentially jeopardize the production of the oil and gas operation and/or the safety of personnel. Indeed, it is estimated that prevention of hydrate plug formation and their removal represents roughly 70% of deep-water oil and gas flow-assurance challenges.

Present day thermoplastic materials, for example polyolefins, polyamides, engineering thermoplastics (e.g., PVDF), and syntactic polypropylene (PP) foam are typically used as thermal insulation layers in the conduits described herein for hydrocarbon fluid transport. Such materials can have various limitations. For example, syntactic PP foam is a commonly used thermal insulating material for conduits, having an initial thermal conductivity at 0.16 watt per meter Kelvin (W/mK). However, as a conduit, and in turn the syntactic PP material included in the conduit, is exposed to various operational conditions, such as pressure and extreme temperatures, the thermal conductivity quality diminishes. To compensate, the syntactic PP material must be over-engineered to last the duration of a conduit's life (e.g., 20 or 30 years), thereby resulting in larger, thicker, and heavier conduits.

It has now been found that certain thermoplastic vulcanizate (TPV) compositions provide attractive alternatives to the current materials used for certain conduit components. The TPV compositions exhibit low thermal conductivity and durability for use during the entire lifetime of a conduit, thereby allowing thinner (e.g., reduced outer diameter) and lighter conduits to be used and associated reduced costs to be realized.

One or more illustrative embodiments incorporating the embodiments of the present disclosure are included and presented herein. Not all features of a physical implementation are necessarily described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related, and other constraints, which vary by implementation and from time to time. While a developer's efforts might be time-consuming, such efforts would be, nevertheless, a routine undertaking for those of ordinary skill in the art and having benefit of this disclosure.

Unless otherwise indicated, all numbers expressing quantities of ingredients, properties such as physical properties, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques. Where the term "less than about" or "more than about" is used herein, the quantity being modified includes said quantity, thereby encompassing values "equal to." That is "less than about 3.5%" includes the value 3.5%, as used herein.

While compositions and methods are described herein in terms of "comprising" various components or steps, the compositions and methods can also "consist essentially of" or "consist of" the various components and steps.

Various terms as used herein are defined below. To the extent a term used in a claim is not defined below, it should be given the broadest definition persons in the pertinent art have given that term as reflected in one or more printed publications or issued patents.

Thermoplastic Vulcanizate Compositions

As used herein, the term "thermoplastic vulcanizate" (also referred to herein as simply "TPV"), and grammatical variants thereof, is broadly defined as any material that includes (i) a dispersed phase of a rubber that has been at least partially cured and (ii) a continuous phase including at least one thermoplastic component (e.g., a polyolefinic thermoplastic resin). A TPV material may further include other ingredients, other additives, or combinations thereof.

The term "vulcanizate," and grammatical variants thereof, means a composition that includes some component (e.g., rubber) that has been vulcanized. The term "vulcanized," and grammatical variants thereof, is defined herein as a composition, in which all or a portion of the composition (e.g., crosslinkable rubber) has been subjected to some degree or amount of vulcanization. Accordingly, the term encompasses both partial and total vulcanization. A preferred type of vulcanization is "dynamic vulcanization," discussed below, which also produces a "vulcanizate." Also, in at least one specific embodiment, the term vulcanized refers to more than insubstantial vulcanization (e.g., curing (or crosslinking)) that results in a measurable change in pertinent properties (e.g., a change in the melt flow index (MFI) of the composition by 10% or more, according to any ASTM-1238 procedure). In at least one or more contexts, the term vulcanization encompasses any form of curing (or crosslinking), both thermal and chemical, that can be utilized in dynamic vulcanization.

The term "dynamic vulcanization," and grammatical variants thereof, means vulcanization or curing of a curable rubber blended with a thermoplastic component (e.g., a thermoplastic resin component) under conditions of shear at temperatures sufficient to plasticize the mixture. In at least one embodiment, the rubber component is simultaneously crosslinked and dispersed as micro-sized particles within the thermoplastic component. Depending on the degree of cure, the rubber to thermoplastic component ratio, compatibility of rubber component and thermoplastic component, the kneader type and the intensity of mixing (shear rate), other morphologies, such as co-continuous rubber phases in the plastic matrix, are possible.

As the term is used herein, a "partially vulcanized," and grammatical variants thereof (e.g., "at least partially vulcanized"), with reference to a rubber component is one wherein more than 5 weight percent (wt. %) of the rubber component (e.g., crosslinkable rubber component) is extractable in boiling xylene, subsequent to vulcanization, preferably dynamic vulcanization (e.g., crosslinking of the rubber phase of the thermoplastic vulcanizate). For example, at least 5 wt. % and less than 20 wt. %, or less than 30 wt. %, or less than 50 wt. % of the rubber component may be extractable from the specimen of the thermoplastic vulcanizate in boiling xylene, encompassing any value and subset therebetween. The percentage of extractable rubber can be determined by the technique set forth in U.S. Pat. No. 4,311,628, which is hereby incorporated by reference in its entirety.

Rubber Component

The rubber component of the TPV described herein for use in the conduits of the present disclosure may be any material that is considered by persons skilled in the art to be a "rubber," preferably a crosslinkable rubber component (e.g., prior to vulcanization) or crosslinked rubber component (e.g., after vulcanization). That is, the rubbers that may be employed to form the rubber component (phase) of the TPV compositions used in the conduits described herein may include any polymers that are capable of being cured or crosslinked. Reference to a rubber component may include mixtures of more than one rubber. Non-limiting examples of rubbers may include olefinic elastomeric copolymers, butyl rubber, and mixtures thereof. In one or more embodiments, olefinic elastomeric copolymers may include, but are not limited to, ethylene-propylene-non-conjugated diene rubbers or propylene-based rubber copolymers containing units derived from non-conjugated diene monomers. In some embodiments, the rubber component may be ethylene-propylene copolymers (EPM), including saturated compounds, that can be vulcanized using free radical generators such as organic peroxides, as described in U.S. Pat. No. 5,177,147, the entirety of which is incorporated herein by reference, or other curing system. Accordingly, rubber components may include, but are not limited to, ethylene-propylene diene monomer rubber (EPDM) or EPDM-type rubber, for example, an EPDM-type rubber can be a terpolymer derived from the polymerization of at least two different monoolefin monomers having from 2 to 10 carbon atoms, preferably 2 to 4 carbon atoms, and at least one poly-unsaturated olefin having from 5 to 20 carbon atoms, encompassing any value and subset therebetween.

As used herein and except as stated otherwise, the term "copolymer," and grammatical variants thereof, refers to a polymer derived from two or more monomers (e.g., terpolymers, tetrapolymers, and the like).

The term "ethylene-propylene rubbers," and grammatical variants thereof, refers to rubbery copolymers polymerized from ethylene, propylene, and at least one diene monomer. The diene monomers may include, but are not limited to, 5-ethylidene-2-norbornene; 5-vinyl-2-norbornene; divinylbenzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; and any combination thereof. As will be discussed in more detail below, in certain embodiments, notably in producing the TPV composition used in the outer protective sheath or thermally insulating layer of the conduits described herein, the rubber component may comprise an ethylene-α-olefin-vinyl norbornene rubber.

The ethylene-propylene rubber may include from about 40 to about 85% by weight (wt. %), or from about 50 to about 70% by weight, or from about 60 to about 66% by weight of units derived from ethylene based on the total weight of ethylene and propylene in the rubber, encompassing any value and subset therebetween. In addition, the ethylene-propylene rubber may contain from about 0.1 to about 15% by weight, or from about 0.5 to about 12% by weight, or from about 1 to about 10% by weight, or from about 2 to about 8% by weight of units derived from diene monomer, encompassing any value and subset therebetween. Expressed in mole percent, the ethylene-propylene rubber may include from about 0.1 to about 5 mole percent, or from about 0.5 to about 4 mole percent, or from about 1 to about 2.5 mole percent units derived from diene monomer, encompassing any value and subset therebetween. In one or more embodiments, where the diene includes 5-ethylidene-2-norbornene, the ethylene-propylene rubber may include at least 1% by weight, or at least 3% by weight, or at least 4% by weight, or at least 5% by weight, or from about 1 to about 15% by weight, or from about 5% to about 12% by weight, or from about 7% to about 11% by weight units deriving from 5-ethylidene-2-norbornene, encompassing any value and subset therebetween. In one or more embodiments, where the diene includes 5-vinyl-2-norbornene, the ethylene-propylene rubber may include at least 1% by weight, or at least 3% by weight, or at least 4% by weight, or at least 5% by weight, or from about 1 to about 15% by weight, or from about 5% to about 12% by weight, or from about 7% to about 11% by weight units deriving from 5-vinyl-2-norbornene, encompassing any value and subset therebetween.

The ethylene-propylene rubber may have a weight average molecular weight ($M_w$) in the range of 100,000 g/mole to 1,200,000 g/mole, encompassing any value and subset therebetween. The $M_w$ may be greater than 100,000 g/mole, or greater than 200,000 g/mole, or greater than 400,000 g/mole, or greater than 600,000 g/mole. Preferably, the $M_w$ of the ethylene-propylene rubber is less than 1,200,000 g/mole, or less than 1,000,000 g/mole, or less than 900,000 g/mole, or less than 800,000 g/mole.

Suitable ethylene-propylene rubbers may have a number average molecular weight ($M_n$) in the range of 20,000 g/mole to 500,000 g/mole, encompassing any value and subset therebetween. The $M_n$ may be greater than 20,000 g/mole, or greater than 60,000 g/mole, or greater than 100,000 g/mole, or greater than 150,000 g/mole, encompassing any value and subset therebetween. The $M_n$ of the ethylene-propylene rubbers may be less than 500,000 g/mole, or less than 400,000 g/mole, or less than 300,000 g/mole, or less than 250,000 g/mole.

Techniques for determining the molecular weight ($M_n$, $M_w$, and $M_z$) and molecular weight distribution (MWD) may be found in U.S. Pat. No. 4,540,753, which is incorporated by reference herein in its entirety, and in Macromolecules, 1988, volume 21, page 3360, by Verstrate et al. with a polystyrene standard, which is also herein incorporated by reference in its entirety.

The ethylene-propylene rubber used herein may also be characterized by having a Mooney viscosity ($ML_{(1+4)}$ at 125° C.) per ASTM D-1646, of from about 10 to about 500, or from about 50 to about 450, encompassing any value and subset therebetween.

In some embodiments, the ethylene-propylene rubber may be characterized by having an intrinsic viscosity, as measured in decalin at 135° C. per ASTM D-1601, of from about 1 to about 8 deciliters per gram (dl/g), or from about 3 to about 7 dl/g, or from about 4 to about 6.5 dl/g, encompassing any value and subset therebetween.

In some embodiments, the ethylene-propylene rubber used herein in the conduits of the present disclosure may have a glass transition temperature ($T_g$), as determined by Differential Scanning calorimetry (DSC) according to ASTM E-1356 with a heating/cooling rate of 10° C./minute, that is less than −20° C., in other embodiments less than −30° C., in other embodiments less than −50° C., and in other embodiments from about −20 to about −60° C.

Suitable ethylene-propylene rubbers may be manufactured or synthesized by using a variety of techniques. For example, they may be synthesized by employing solution, slurry, or gas phase polymerization techniques that employ various catalyst systems. Exemplary catalysts include, but are not limited to, Ziegler-Natta systems such as those including vanadium catalysts, and single-site catalysts including constrained geometry catalysts involving Group IV-VI metallocenes. Elastomeric copolymers are commercially available under the tradenames VISTALON™ (available from ExxonMobil Chemical Company, Houston, Tex.), KELTAN™ (available from Lanxess Corporation, Pittsburgh, Pa.), NORDEL IP™ (available from Dow Chemical Company, Midland, Mich.), Nordel MG™ (available from Dow Chemical Company, Midland, Mich.), ROYALENE™ (available from Lion Elastomers, Geismar, La.) and BUNA™ (available from Lanxess Corporation, Pittsburgh, Pa.).

In certain embodiments, preferably in producing the TPV composition used in the outer protective sheath thermally insulating layer, the rubber component may comprise an ethylene-α-olefin-vinyl norbornene rubber. Suitable α-olefins include, but are not limited to, propylene, 1-butene, 1-hexene, 1-octene, 2-methyl-1-propene, 3-methyl-1-pentene, 4-methyl-1-pentene, 5-methyl-1-hexene, and any combination thereof. In some embodiments, preferably in producing the TPV composition for use in the outer protective sheath, the rubber component is one or more of ethylene-α-olefin-vinyl norbornene, ethylene-α-olefin-copolymer with vinyl norbornene, and/or ethylene-α-olefin copolymer, that has been at least partially cured with a curing agent.

In some embodiments, preferably in producing the TPV used in the insulation layer, the rubber component may be a butyl rubber. The term "butyl rubber," and grammatical variants thereof, includes a polymer that predominantly includes repeat units from isobutylene but also includes a few repeat units of a monomer that provides a site for crosslinking. Monomers providing sites for crosslinking may include, but are not limited to, a polyunsaturated monomer, such as a conjugated diene or divinylbenzene. In one or more embodiments, the butyl rubber polymer may be halogenated to further enhance reactivity in crosslinking, which are referred to herein as "halobutyl rubbers."

The rubber component may be, for example, homopolymers of conjugated dienes having from 4 to 8 carbon atoms and rubber copolymers having at least 50 weight percent repeat units from at least one conjugated diene having from 4 to 8 carbon atoms, encompassing any value and subset therebetween.

In some embodiments, notably in producing the TPV composition used in the outer protective sheath or thermally insulating layer, the rubber component may comprise repeating units derived from at least one $C_4$ to $C_7$ isomonoolefin monomer, such as isobutene. In preferred embodiments, the thermally insulating layer comprising a TPV composition described herein having a rubber component comprising repeating units derived from at least one $C_4$ to $C_7$ isomonoolefin monomer, such as isobutene. In other embodiments, the rubber component may comprise repeating units derived from at least one $C_4$ to $C_7$ isomonoolefin monomer and repeating units derived from at least one $C_4$ to $C_7$ multiolefin monomer, such as isoprene and paramethyl-styrene. Preferably, paramethyl-styrene is the multiolefin monomer. Preferably, the rubber is halogenated, for instance with bromine or chlorine. Polymers suitable for the rubber component include, but are not limited to, brominated isobutylene paramethyl-styrene terpolymers commercially available from ExxonMobil Chemical Company under the trade name EXXPRO™ specialty elastomers; butyl and halogenated butyl polymers commercially available from ExxonMobil Chemical Company under the trade names EXXON™ Bromobutyl 2244, EXXON™ Bromobutyl 2255, and EXXON™ Butyl 268; and brominated isobutylene-isoprene copolymer commercially available from Arlanxeo Holding B.V. under the trade names Brominated X_BUTYL™ and Regular X_BUTYL™.

In some embodiments, the rubber phase comprising the $C_4$ to $C_7$ isomonoolefin monomer or the $C_4$ to $C_7$ isomonoolefin monomer with repeating units derived from at least one $C_4$ to $C_7$ multiolefin monomer may be present in the TPV composition in the outer protective sheath and/or the thermally insulating layer. In some embodiments, the thermally insulating layer and the outer protective sheath are the same layers or are different layers of a conduit, as described herein. In some embodiments, greater than one thermally insulating layer may be present in various portions of the conduit, which may or may not include the outer protective sheath, without departing from the scope of the present disclosure.

Accordingly, the rubber component for use in one or more layers of the conduits of the present disclosure (e.g., one or more thermally insulating layer and/or an outer protective sheath) may comprise one or more of an EPDM rubber, an isobutylene-isoprene rubber (IIR), a bromo isobutylene-isoprene rubber (BIIR), and/or a brominated isobutylene paramethyl-styrene terpolymer rubber (BIMSM). In some embodiments, the rubber component is preferably crosslinked. Examples of suitable commercially available crosslinked rubbers for use in the embodiments of the present disclosure include, but are not limited to, brominated copolymers of isobutylene and paramethylstyrene under the tradename EXXPRO™ (e.g., EXXPRO™ 3745) (available from ExxonMobil Chemical Company, Houston, Tex.).

The rubber may be at least partially or fully cured by employing dynamic vulcanization techniques. The rubber component may be vulcanized under conditions of shear and extension at a temperature at or above the melting point of the thermoplastic component in the TPV. The rubber component is preferably simultaneously crosslinked and dispersed (preferably as fine particles) within the thermoplastic component matrix, although other morphologies, such as co-continuous morphologies, may exist depending on the degree of cure, the rubber to plastic viscosity ratio, the intensity of mixing, the residence time, the temperature, and the like.

After dynamic vulcanization, the rubber component may be in the form of finely-divided and well-dispersed particles of vulcanized or cured rubber within a continuous thermoplastic component phase or matrix, although a co-continuous morphology is also possible. In those embodiments, where the cured rubber is in the form of finely-divided and well-dispersed particles within the thermoplastic medium, the rubber particles typically have an average diameter that is less than 50 μm, or less than 30 μm, or less than 10 μm, or less than 5 μm, or less than 1 μm, each of which may have a lower range of 0.1 μm, for example, encompassing any value and subset therebetween. In a preferred embodiment, the rubber particles of the TPV composition have an average diameter in the range of 0.8 to 5 μm, encompassing any value and subset therebetween.

As described above, the rubber component within the TPV composition for use in the conduits described herein (i.e., the outer protective sheath and/or a thermally insulating layer) is preferably at least partially cured. In one or more embodiments, the rubber is advantageously completely or fully cured. The degree of cure can be measured by determining the amount of rubber that is extractable from the thermoplastic vulcanizate by using cyclohexane or boiling xylene as an extractant. Preferably, the rubber has a degree of cure where not more than 15 we. %, or not more than 10 wt. %, or not more than 5 wt. %, or not more than 3 wt. %, including 0 wt. %, is extractable by cyclohexane at 23° C. as described in U.S. Pat. Nos. 4,311,628, 5,100,947 and 5,157,081, all of which are incorporated herein by reference in their entirety. Alternatively, the rubber may have a degree of cure such that the crosslink density is at least $4 \times 10^{-5}$, or at least $7 \times 10^{-5}$, or at least $10 \times 10^{-5}$ moles per milliliter of rubber. See Crosslink Densities and Phase Morphologies in Dynamically Vulcanized TPEs, by Ellul et al., Rubber Chemistry and Technology, Vol. 68, pp. 573-584 (1995), which is incorporated herein by reference in its entirety.

The cure systems for use in dynamically vulcanizing the rubber component of the present disclosure is not considered to be particularly limited. For example, the rubber component of the TPV compositions may be cured by various curatives. As used herein, the term "curative," and grammatical variants thereof, refers to any substance that is capable of curing or crosslinking the rubber component of the present disclosure. Examples of suitable curatives include, but are not limited to, phenolic resins (e.g., novolac resins), metal oxides (e.g., ZnO, CaO, MgO, $Al_2O_3$, $CrO_3$, FeO, $Fe_2O_3$, NiO), stearic acid, and the like, and any combination thereof), hydrosilylation (a.k.a. silicon-containing cure systems, such as silane curing (hydrosiloxane curing)), free radical cure systems (e.g., peroxides), moisture curing, silane curing followed by moisture curing, and the like, and any combination thereof. In some embodiments, the curative is a phenolic resin or hydrosiloxane.

Useful phenolic cure systems are disclosed in U.S. Pat. Nos. 2,972,600, 3,287,440, 5,952,425 and 6,437,030, which are incorporated herein by reference in their entirety. In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms, encompassing any value and subset therebetween.

An example of a phenolic resin curative includes, but is not limited to, that defined according to Formula A:

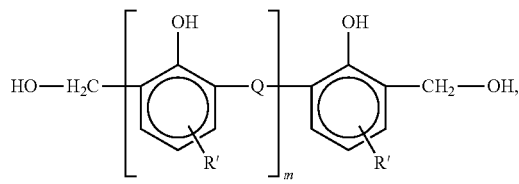

Formula A where Q is a divalent radical of —$CH_2$— or —$CH_2$—O—$CH_2$—, m is zero or a positive integer from 1 to 20, and R' is an organic group. In one embodiment, Q is the divalent radical —$CH_2$—O—$CH_2$—, m is zero or a positive integer from 1 to 10, and R' is an organic group having less than 20 carbon atoms. In other embodiments, m is zero or a positive integer from 1 to 10 and R is an organic radical having between 4 and 12 carbon atoms.

The phenolic resin may be employed in an amount, such as from about 2 to about 6 parts by weight, or from about 3 to about 5 parts by weight, or from about 4 to about 5 parts by weight per 100 parts by weight of rubber component, encompassing any value and subset therebetween.

The phenolic resin may be accompanied with a complementary catalyst, such as stannous chloride ($SnCl_2$). In some embodiments, the amount of stannous chloride may include from about 0.5 to about 2.0 parts by weight, or from about 1.0 to about 1.5 parts by weight, or from about 1.2 to about 1.3 parts by weight per 100 parts by weight of rubber component, encompassing any value and subset therebetween. In conjunction therewith, from about 0.1 to about 6.0 parts by weight, or from about 1.0 to about 5.0 parts by weight, or from about 2.0 to about 4.0 parts by weight of zinc oxide may also be employed, encompassing any value and subset therebetween. In one or more embodiments, the olefinic rubber employed with the phenolic curatives includes diene units derived from 5-ethylidene-2-norbornene. In a preferred embodiment, the phenolic resin is dispersed in paraffinic oil (e.g., pre-dispersed in oil) (e.g., 70% wt. oil/30% wt. solid phenolic resin), which may be referred to herein as "phenolic resin in o" or "RIO." An example of a suitable commercially available phenolic curatives (e.g., a phenolic resin in oil having 30% wt. phenolic resin and 70% wt. oil) include resole-type resins by SI Group, Inc., Schenectady, N.Y.

As used herein, "hydrosilylation" refers to adding a silicon hydride across a multiple bond, often with a transition metal catalyst. This curing agent has been described in CA Patent No. 2190059 and U.S. Pat. No. 7,951,871, incorporated by reference herein in their entirety.

In certain embodiments, in producing the TPV composition used in the outer protective sheath and/or the thermally insulating layer, the rubber phase may comprise an ethylene-α-olefin-vinyl norbornene rubber cured with silicon-containing curatives (i.e., hydrosilation). Useful silicon-containing curatives include, but are not limited to, silicon hydride compounds having at least two SiH groups. These compounds react with carbon-carbon double bonds of unsaturated polymers in the presence of a hydrosilation catalyst. Silicon hydride compounds that are useful in the embodiments described herein include, but are not limited to, methylhydrogen polysiloxanes, methylhydrogen dimethylsiloxane copolymers, alkyl methyl polysiloxanes, bis(dimethylsilyl)alkanes, bis(dimethylsilyl)benzene, and the like, and any combination thereof.

In some embodiments, the curative may be present from 0.5 phr to 20 phr, or 0.5 phr to 15 phr, encompassing any value and subset therebetween. As used herein, the term "phr" means parts per hundred dry rubber (i.e., rubber without any oil), and is a measure of components within a composition relative to the total weight of rubber, based on 100 parts by weight of the rubber. Measurement in "phr" is a measurement unit commonly known by those of skill in the art.

In some embodiments, the rubber component (continuous phase) comprises from 10 to 95 wt. %, or such as from 20 to 95 wt. %, or such as from 10 to 80 wt. %, such as from 15 to 75 wt. %, or such as from 15 to 70 wt. %, or such as from 20 to 60 wt. % of the total weight of the thermoplastic vulcanizate composition (including any additives), encompassing any value and subset therebetween. In some embodiments, the rubber component is present in the TPV composition of the present disclosure in an amount of from 20 to 95 wt. %, or 20 to 50 wt. % of the total weight of the thermoplastic vulcanizate composition, encompassing any value and subset therebetween.

Thermoplastic Phase

As used herein, the terms "thermoplastic component," "thermoplastic phase," or "thermoplastic polymer," and grammatical variants thereof, of the thermoplastic vulcanizates of the present disclosure refers to any material that is not a "rubber" and that is a polymer or polymer blend considered by persons skilled in the art as being thermoplastic in nature (e.g., a polymer that softens when exposed to heat and returns to its original condition when cooled to room temperature). Each such term may be used interchangeably herein.

The thermoplastic component may include, for example, thermoplastic polymers that are solid, generally high molecular weight plastic resins. Exemplary thermoplastic polymers include, but are not limited to, crystalline, semi-crystalline, and crystallizable polyolefins, olefin homo and copolymers, non-olefin resins, and the like, and any combination thereof.

In an embodiment, the thermoplastic component is a polymer including, but not limited to, a polyamide resin(s) and mixtures thereof; particularly preferred resins include, for example, Nylon 6, Nylon 6/66 copolymer, Nylon 11, Nylon 12, Nylon 610, Nylon 612 and their blends. According to an alternative preferred embodiment of the present disclosure, the thermoplastic component is an elastomer composition formulated using Nylon 11 or Nylon 12, and Nylon 6/66 copolymer in a ratio of composition (ratio by weight) of about 10/90 to about 90/10, preferably about 30/70 to about 85/15, encompassing any value and subset therebetween.

The thermoplastic component may comprise one or more polyolefins, including polyolefin homopolymers and polyolefin copolymers. In one or more embodiments, the polyolefinic thermoplastic component comprises at least one of i) a polymer prepared from olefin monomers having 2 to 7 carbon atoms and/or ii) copolymer prepared from olefin monomers having 2 to 7 carbon atoms with a (meth)acrylate or a vinyl acetate. In some embodiments, the thermoplastic component may be formed by polymerizing ethylene or α-olefins such as propylene, 1-butene, isobutylene, 1-pentene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene, and any combination thereof and copolymers thereof (e.g., with methacrylates and/or vinyl acetates). In some embodiments, the propylene-based polymers may also include units deriving from copolymerization with ethylene and/or α-olefins such as 1-butene, 1-hexene, 1-octene, 2-methyl-1-propene, 3-methyl-1-pentene, 4-methyl-1-pentene, 5-methyl-1-hexene, and any combination thereof.

In some embodiments, the thermoplastic component of the TPV composition may include impact and/or random copolymers of propylene with ethylene or the higher α-olefins, described above, or with $C_{10}$ to $C_{20}$ diolefins. Comonomer contents for these propylene copolymers may be from about 1% to about 30% by weight of the polymer, encompassing any value and subset therebetween, for example, as in U.S. Pat. No. 6,867,260, which is incorporated by reference herein in its entirety. Suitable commercially available thermoplastic components include olefinic elastomers under the tradename VISTAMAXX™ (available from ExxonMobil Chemical Company, Houston, Tex. or VERSIFY™ available from the Dow Chemical Company, Midland, Mich.).

Other suitable polyolefin copolymers may include copolymers of olefins with styrene such as styrene-ethylene copolymer or polymers of olefins with α,β-unsaturated acids and/or α,β-unsaturated esters, such as polyethylene-acrylate copolymers. Non-olefin thermoplastic polymers may include, but are not limited to, polymers and copolymers of styrene, α,β-unsaturated acids, α,β-unsaturated esters, and any combination thereof. For example, polystyrene, polyacrylate, and/or polymethacrylate may be used. Blends or mixtures of two or more polyolefin thermoplastics such as those described herein, with or without other polymeric modifiers, are also suitable for use in the TPV composition embodiments described herein. Suitable thermoplastic polymers may also include impact and reactor copolymers.

In one or more embodiments, the thermoplastic component contains polypropylene. As used herein, the term "polypropylene," and grammatical variants thereof, broadly means any polymer that is considered a "polypropylene" by persons skilled in the art (as reflected in at least one patent or publication), and includes, but is not limited to, homo, impact, and random polymers of propylene. In one or more embodiments, the thermoplastic component is or includes isotactic polypropylene. Preferably, the thermoplastic component contains one or more crystalline propylene homopolymers or copolymers of propylene having a melting temperature greater than 105° C. as measured by differential scanning calorimetry (DSC). Preferred copolymers of propylene include, but are not limited to, terpolymers of propylene, impact copolymers of propylene, random polypropylene copolymers, and any combination thereof. Preferred comonomers have 2 carbon atoms, or from 4 to 12 carbon atoms. Preferably, the comonomer is ethylene. Such thermoplastic components and methods for making the same are described in U.S. Pat. No. 6,342,565, which is incorporated herein by reference in its entirety. In one or more preferred embodiments, the polyolefin thermoplastic component comprises polyethylene, polypropylene, ethylene-propylene copolymer, and any combination thereof. In some embodiments, the thermoplastic component is a high melt strength (HMS) thermoplastic propylene, such as a high melt strength polypropylene (HMS-PP) and/or a high melt strength long chain branched polypropylene (HMS LCB-PP). In some embodiments, alone or in combination with any other thermoplastic compound, the thermoplastic propylene may be a polypropylene fractional melt flow homopolymer ("fractional PP"). In some embodiments, the plastic phase comprises a random copolymer or impact copolymer polypropylene, or combinations thereof.

The thermoplastic component may include propylene-based polymers including solid, generally high-molecular weight plastic resins that primarily comprise units deriving from the polymerization of propylene. In certain embodiments, at least 75%, or at least 90%, or at least 95%, or at least 97%, including up to 100%, of the units of the propylene-based polymer derive from the polymerization of propylene. In some embodiments, these polymers include homopolymers of propylene.

The propylene-based polymers may include semi-crystalline polymers. These polymers may be characterized by a crystallinity of at least 25% by weight, or at least 55% by weight, or at least 65%, or at least 70% by weight. Crystallinity may be determined by dividing the heat of fusion of a sample by the heat of fusion of a 100% crystalline polymer, which is assumed to be 290 joules/gram (J/g) for polypropylene.

In one or more embodiments, the propylene-based polymers may be characterized by a heat of fusion ($H_f$) of at least 52.3 J/g, or in excess of 100 J/g, or in excess of 125 J/g, or in excess of 140 J/g. In some embodiments, the propylene-based polymers may be characterized by a $H_f$ in the range of 52.3 J/g and 290 J/g, encompassing any value and subset therebetween.

In one or more embodiments, useful propylene-based polymers can have a melt mass-flow rate (MFR) as determined by ASTM D-1238, 2.16 kg @ 230° C. in the range of 100 decigrams per minute (dg/min) to 0.5 dg/min, encompassing any value and subset therebetween. For example, the propylene-based polymers may have a MFR of less than 100 dg/min, or less than 50 dg/min, or less than 10 dg/min, or less than 5 dg/min. In some embodiments, the propylene-based polymers can have a MFR of at least 0.1 dg/min, or 0.2 dg/min, or at least 0.5 dg/min. In a preferred embodiment, the propylene-based polymers may have a MFR from about 0.5 dg/min to about 5 dg/min. In one or more embodiments, useful propylene-based polymers can have a melt temperature (Tm) that is from about 110° C. to about 170° C., or from about 140° C. to about 168° C., or from about 160° C. to about 165° C., encompassing any value and subset therebetween. They may have a glass transition temperature ($T_g$) of from about −10° C. to about 10° C., or from about −3° C. to about 5° C., or from about 0° C. to about 2° C., encompassing any value and subset therebetween. In one or more embodiments, they may have a crystallization temperature ($T_a$) of at least about 75° C., or at least about 95° C., or at least about 100° C., or at least 105° C., or ranging from 105° C. to 130° C., encompassing any value and subset therebetween.

The propylene-based thermoplastic component may have a $M_w$ in the range of 50,000 g/mole to 1,000,000 g/mole, encompassing any value and subset therebetween. The $M_w$ may be greater than 80,000 g/mole, or greater than 100,000 g/mole, or greater than 200,000 g/mole, or greater than 300,000 g/mole. Preferably, the $M_w$ of the propylene-based thermoplastic component is less than 500,000 g/mole, or less than 400,000 g/mole, or less than 300,000 g/mole, or less than 250,000 g/mole.

The propylene-based thermoplastic component may have a $M_n$ in the range of 10,000 g/mole to 600,000 g/mole, encompassing any value and subset therebetween. The $M_n$ may be greater than 50,000 g/mole, or greater than 80,000 g/mole, or greater than 100,000 g/mole, or greater than 200,000 g/mole. Preferably, the $M_n$ of the propylene-based thermoplastic component is less than 200,000 g/mole, or less than 100,000 g/mole, or less than 80,000 g/mole, or less than 70,000 g/mole.

The propylene-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

As stated above, in some embodiments, the propylene-based polymers include a homopolymer of a high-crystallinity isotactic or syndiotactic polypropylene. Such polypropylene may have a density of from about 0.89 to about 0.91 g/cc, with the largely isotactic polypropylene having a density of from about 0.90 to about 0.91 g/cc, encompassing any value and subset therebetween. Also, high and ultra-high molecular weight polypropylene having a fractional melt flow rate can be employed, as stated above. In one or more embodiments, the propylene-based thermoplastic component may be characterized by a MFR (ASTM D-1238; 2.16 kg @ 230° C.) that is less than or equal to 10 dg/min, or less than or equal to 1.0 dg/min, or less than or equal to 0.5 dg/min. In some embodiments, the propylene-based thermoplastic component may be characterized by a MFR (ASTM D-1238; 2.16 kg @ 230° C.) in the range of 0.05 dg/min to 50 dg/min, encompassing any value and subset therebetween.

Examples of suitable propylene-based thermoplastic polymers for use in the embodiments of the TPV compositions described herein include EXXONMOBIL™ PP5341 (available from ExxonMobil Chemical Company); ACHIEVE™ PP6282NE1 (available from ExxonMobil Chemical Company); BRASKEM™ F008F (available from Braskem, Philadelphia, Pa.); and/or polypropylene resins with broad molecular weight distributions as described in U.S. Pat. Nos. 9,453,093 and 9,464,178, the entireties of which are incorporated herein by reference; and/or other polypropylene resins described in U.S. Pat. Pub. Nos. 2018/0016414 and 2018/0051160 (e.g., PDH025 with a melt flow rate of 2.6 g/10 min, as shown in the Table below), the entireties of which are incorporated herein by reference; WAYMAX™ MFX6 (a polypropylene homopolymer having a melt flow rate of 0.8 g/10 min, available from Japan Polypropylene Corporation, Tokyo, Japan); DAPLOY™ WB140 (available from Borealis AG, Vienna, Austria); and AMPLEO™ 1025MA and AMPLEO™ 1020GA (available from Braskem); and/or other suitable polypropylenes; and any combination thereof.

In some embodiments, the thermoplastic component includes, alone or in addition to a polypropylene resin, a polyethylene resin. In one or more embodiments, this polyethylene resin includes at least 90%, or at least 95%, or at least 99%, including 100%, of polymeric units derive from ethylene. In one or more embodiments, this polyethylene resin is a polyethylene homopolymer.

In one or more embodiments, the polyethylene used alone or in conjunction with the polypropylene may be characterized by having a $M_w$ of from about 50 to 1000 kg/mole, or from about 100 to 500 kg/mole, or from about 150 to 350 kg/mole, encompassing any value and subset therebetween. This polyethylene may be characterized by having a polydispersity index (Mw/Mn) that is less than 20, or less than 15, or less than 10, or less than 9. The polyethylene may be characterized by having a polydispersity index (Mw/Mn) that is higher than 2, or higher than 3, or higher than 5, or higher than 10, for example.

In one or more embodiments, the polyethylene used alone or in conjunction with the polypropylene may be characterized by having a melt flow index (MFI) from 0.1 to 50 dg/min, or from 0.4 to 12 dg/min, or from 0.5 to 10 dg/min, per ASTM D-1238 at 190° C. and 2.16 kg load, encompassing any value and subset therebetween.

In one or more embodiments, the polyethylene used alone or in conjunction with the polypropylene may be characterized by an intrinsic viscosity as determined per ASTM D 1601 and D 4020 that is from 0.5 to 10 dl/g, or from 1.0 to 9.0 dl/g, or from 1.5 to 8.0 dl/g, encompassing any value and subset therebetween.

In one or more embodiments, the polyethylene used alone or in conjunction with the polypropylene resin may be characterized by a density as measured per ASTM D4883 that is greater than 0.8 g/cc, or greater than 0.85 g/cc, or greater than 0.8 g/cc, or greater than 0.93 g/cc, or greater than 0.94 g/cc, or greater than 0.95 g/cc. In some embodiments, the polyethylene used alone or in conjunction with the polypropylene resin may be characterized by a density as measured per ASTM D4883 that is from 0.8 g/cc to 1.0 g/cc, encompassing any value and subset therebetween. In one or more embodiments, the polyethylene used alone or in conjunction with the polypropylene may be characterized by an intrinsic viscosity as determined per ASTM D 1601 and D 4020 that is from 0.5 to 10 dl/g, or from 1.0 to 9.0 dl/g, or from 1.5 to 8.0 dl/g, encompassing any value and subset therebetween.

Polymers useful as the polyethylene used alone or in conjunction with the polypropylene may be generally referred to as high density polyethylene resins. For example, suitable high density polyethylene resins include those commercially available under the tradename HDPE HD7960.13 (available from ExxonMobil Chemical Company, Houston, Tex.).

Generally, the thermoplastic component (dispersed phase) comprises from 5 to 90 wt. %, such as from 5 to 70 wt. %, such as from about 5 to 75 wt. %, such as from 7 to 60 wt. %, such as from 7 to 70 wt. %, such as from 10 to 55 wt. % of the total weight of the thermoplastic vulcanizate composition (including any additives), encompassing any value and subset therebetween. In some embodiments, the thermoplastic component is included in the TPV compositions in an amount of from 20% to 70% wt. % of the total weight of the thermoplastic vulcanizate composition, encompassing any value and subset therebetween. In some embodiments, the thermoplastic component may be present from 10 phr to 200 phr, encompassing any value and subset therebetween.

Additional Additives

The thermoplastic vulcanizate composition described herein may include any or all of the optional additives described hereinbelow. The term "additive," and grammatical variants thereof, includes any component of the thermoplastic vulcanizates of the present disclosure except the rubber component and the thermoplastic component. Examples of suitable additives include, but are not limited to, plasticizers (including additive oils), fillers (e.g., particulate fillers), curatives, compatibilizers, thermoplastic modifiers, lubricants, antioxidants, antiblocking agents, stabilizers, anti-degradants, anti-static agents, waxes, foaming agents, pigments, processing aids, adhesives, tackifiers, wax, discontinuous fibers (such as world cellulose fibers), and any combination thereof.

Various plasticizers may be included in the TPV compositions of the present disclosure for forming the outer protective sheath and/or a thermally insulating layer of a conduit described herein. A "plasticizer," and grammatical variants thereof, refers to a compound, typically a solvent, added to the TPV composition described herein to produce or promote plasticity and flexibility and reduce brittleness. Examples of suitable plasticizers include, but are not limited to paraffin oils, aromatic oils, naphthenic oils, synthetic oils, oligomeric plasticizers, and the like, and any combination thereof. The term "plasticizer" is used interchangeably with the term "oil" in the present disclosure. Examples of suitable synthetic oils include, but are not limited to, polyisobutylene (PIB), poly(isobutylene-co-butene), polylinear α-olefins, poly-branched α-olefins, hydrogenated polyalphaolefins, and the like, and any combination thereof. Synthetic polyalphaolefins are also suitable plasticizers for use in the embodiments of the present disclosure. In some embodiments, the synthetic oils may include synthetic polymers or copolymers having a viscosity of about 20 centipoise (cP) or more, such as about 100 cP or more, or about 190 cP or more, encompassing any value and subset therebetween, where the viscosity is measured by a Brookfield viscometer according to ASTM D-4402 at 38° C. In these or other embodiments, the viscosity of these oils can be about 4,000 cP or less, such as about 1,000 cP or less, encompassing any value and subset therebetween.

Oligomeric plasticizers may also be used as a plasticizer in the embodiments described herein. Examples of suitable oligomeric plasticizers include, but are not limited to, copolymers of isobutylene and butane, copolymers of butadiene together with a complementary comonomer, isobutylene, high molecular weight copolymers of isobutylene, polyisobutylene in solid or liquid form, and any combination thereof. These oligomeric plasticizers may have a $M_n$ of less than 1,000. Suitable commercially available oligomeric plasticizers include, for example, oligomeric copolymers of isobutylene and butene under the tradenames POLYBUTENE™ (available from Soltex, Inc., Houston, Tex.), INDOPOL™ (available from BP PLC, London, England), and PARAPOL™ (ExxonMobil Chemical Company, Houston, Tex.); and oligomeric copolymers including butadiene commercially under the tradename RICON™ Resin (available from Ricon Resins, Inc., Grand Junction, Colo.).

In some embodiments, the thermoplastic vulcanizates may include an oil such as a mineral oil, a synthetic oil, or a combination thereof. These oils may also be referred to as plasticizers herein (also known in the art as extenders. Mineral oils may include aromatic, naphthenic, paraffinic, and isoparaffinic oils, synthetic oils, and combinations thereof. In some embodiments, the mineral oils may be treated or untreated. Useful mineral oils can be obtained under the tradename SUNPAR™ (available from Sun Chemicals, Parsippany-Troy Hills, N.J.). Others commercially available oils include PARALUX™ and PARAMOUNT™ (both available from Chevron, San Ramon, Calif.). Other oils that may be used include hydrocarbon oils, such as organic esters and synthetic plasticizers. Many oils are derived from petroleum fractions, and have particular ASTM designations depending on whether they fall into the class of paraffinic, naphthenic, or aromatic oils. Other types of oils include alpha olefinic synthetic oils, such as liquid polybutylene. Oils other than petroleum based oils can also be used, such as oils derived from coal tar and pine tar, as well as synthetic oils, such as polyolefin materials.

Examples of oils include base stocks. According to the American Petroleum Institute (API) classifications, base stocks are categorized in five groups based on their saturated hydrocarbon content, sulfur level, and viscosity index (Table A). Lube base stocks are typically produced in large scale from non-renewable petroleum sources. Group I, II, and III base stocks are all derived from crude oil via extensive processing, such as solvent extraction, solvent or catalytic dewaxing, and hydroisomerization, hydrocracking and isodewaxing, isodewaxing and hydrofinishing ["New Lubes Plants Use State-of-the-Art Hydrodewaxing Technology" in Oil & Gas Journal, Sep. 1, 1997; Krishna et al., "Next Generation Isodewaxing and Hydrofinishing Technology for Production of High Quality Base Oils", 2002 NPRA Lubricants and Waxes Meeting, Nov. 14-15, 2002; Gedeon and Yenni, "Use of "Clean" Paraffinic Processing Oils to Improve TPE Properties", Presented at TPEs 2000 Philadelphia, P A., Sep. 27-28, 1999].

Group III base stocks can also be produced from synthetic hydrocarbon liquids obtained from natural gas, coal, or other fossil resources. Group IV base stocks are polyalphaolefins (PAOs), and are produced by oligomerization of alpha olefins, such as 1-decene. Group V base stocks include all base stocks that do not belong to Groups I-IV, such as naphthenics, polyalkylene glycols (PAG), and esters. Characteristics of Groups I-V are provided in Table A.

TABLE A

| API Classification | Group I | Group II | Group III | Group IV | Group V |
|---|---|---|---|---|---|
| % Saturates | <90 | ≥90 | ≥90 | Polyalpha-olefins (PAOs) | All others not belonging to Groups I-IV |
| % S | >0.03 | ≤0.03 | ≤0.03 | | |
| Viscosity Index (VI) | 80-120 | 80-120 | ≥120 | | |

In some embodiments, synthetic oils include polymers and oligomers of butenes, including isobutene, 1-butene, 2-butene, butadiene, and mixtures thereof. In some embodiments, these oligomers can be characterized by a number average molecular weight ($M_n$) of from about 300 g/mol to about 9,000 g/mol, and in other embodiments from about 700 g/mol to about 1,300 g/mol. In some embodiments, these oligomers include isobutenyl mer units. Exemplary synthetic oils include, but are not limited to, polyisobutylene, poly(isobutylene-co-butene), and mixtures thereof. In some embodiments, synthetic oils may include polylinear α-olefins, poly-branched α-olefins, hydrogenated polyalphaolefins, and mixtures thereof.

In some embodiments, the synthetic oils include synthetic polymers or copolymers having a viscosity of about 20 cP or more, such as about 100 cP or more, such as about 190 cP or more, where the viscosity is measured by a Brookfield viscometer according to ASTM D-4402 at 38° C. In these or other embodiments, the viscosity of suitable oils can be about 4,000 cP or less, such as about 1,000 cP or less.

Useful synthetic oils can be commercially obtained under the tradenames SOLTEX™ polybutenes (available from Soltex, Houston, Tex.); INDOPOL™ polybutenes (available from Ineos, League City, Tex.); SPECTRASYN™ white synthetic oils (available from ExxonMobil) (formerly SHF Fluids); ELEVAST™ hydrocarbon fluids (available from ExxonMobil); RISELLA™ white oils produced based on gas to liquid technology (available from Shell Global, The Hague, Netherlands) (e.g., RISELLA™ X 415/420/430); PRIMOL™ white oils (available from ExxonMobil) (e.g., PRIMOL™ 352/382/542); MARCOL™ white oils (available from ExxonMobil) (e.g., MARCOL™ 82/52); and DRAKEOL® white oils (available from Penreco, Karns City, Pa. (e.g., DRAKEOL® 34). Oils described in U.S. Pat. No. 5,936,028 may also be employed, the entirety of which is incorporated herein by reference in its entirety. Any combinations of the aforementioned oils may additionally be used, without departing from the scope of the present disclosure.

Other oils (i.e., plasticizers) may include polymeric processing additives, such as polymeric resins that have a very high melt flow index. These polymeric resins include both linear and branched molecules that have a melt flow rate that is greater than about 500 dg/min, or greater than about 750 dg/min, or greater than about 1000 dg/min, or greater than about 1200 dg/min, or greater than about 1500 dg/min. Typically, these polymeric resins have a melt flow rate that is less than 10,000 dg/min. Mixtures of various branched or various linear polymeric processing additives, as well as mixtures of both linear and branched polymeric processing additives may be used. The preferred linear polymeric resins for use as plasticizers of the present disclosure are polypropylene homopolymers or propylene-ethylene copolymers. The preferred branched polymeric resins include diene-modified polypropylene polymers. Thermoplastic vulcanizates that include similar polymeric resins are disclosed in U.S. Pat. No. 6,451,915, which is incorporated herein by reference in its entirety.

In some embodiments, the plasticizer is included in the TPV composition described herein for use in forming the outer protective sheath and/or thermally insulating layer in an amount of less than 40 wt. %, such as in the range of 5 wt. % to 40 wt. %, or 10 wt. % to 40 wt. %, by weight of the total weight of the thermoplastic vulcanizate composition, encompassing any value and subset therebetween. In some embodiments, the plasticizer may be present from 20 phr to 150 phr, or 50 phr to 150 phr, encompassing any value and subset therebetween.

One or more fillers may be included in the TPV compositions of the present disclosure. A "filler" or "particulate filler," and grammatical variants thereof, may be included in the TPV compositions of the present disclosure to enhance various properties thereof, such as strength, toughness, resistance to tearing, abrasion and flex fatigue, durability, color (i.e., act as a pigment), and the like, and any combination thereof. The fillers may accordingly be reinforcing or non-reinforcing fillers. Suitable fillers include, but are not limited to, zeolites, carbon black, talcum powder, calcium carbonate, clays, silica, talc, syntactic foam, titanium dioxide, and any combination thereof.

The filler(s) may be included in the TPV compositions for use in the conduits described herein in an amount of from 0 to 30 wt. %, or 0 to 20 wt. %, or 0 to 10% by weight of the total thermoplastic vulcanizate composition, encompassing any value and subset therebetween. That is, depending on at least the composition of the TPV, the filler may be optional. In some embodiments, the filler may be present in an amount of from 0 phr to 100 phr, or 1 phr to 100 phr, 0 phr to 40 phr, or 1 phr to 40 phr, or 5 phr to 20 phr, encompassing any value and subset therebetween. In some embodiments, the filler is preferably present from 3 phr to 10 phr, or less, encompassing any value and subset therebetween, such as for use in as a thermally insulating layer. Typically a greater amount of filler may be used when the TPV composition is used as an outer protective layer, such as in the range of 20 phr to 40 phr, encompassing any value and subset therebetween. It is to be understood that an amount therebetween may be used, such as when the TPV composition functions as both an outer protective layer and a thermally insulating layer, for example. In a preferred embodiment, the filler concentration is from about 3 phr to about 10 phr.

In some embodiments, a compatibilizer or compatibilizing agent may be used in the TPV compositions described herein. A "compatibilizer" or "compatibilizing agent," and grammatical variants thereof, refers to a substance included in the TPV compositions of the present disclosure to promote interfacial adhesion between the various components of the TPV (e.g., between polymers, fillers, etc.). Examples of suitable compatibilizers include, but are not limited to, maleic anhydride functionalized polypropylene, maleated polypropylene, carboxylated nitrile butadiene rubber, styrenic block copolymers, polyolefin based compatibilizers, and the like, and any combination thereof. Exemplary polyolefin based commercially available compatibilizers include, but are not limited to, INTUNE™ and INFUSE™ olefinic block copolymers (available from Dow Chemical Company).

The compatibilizer(s) may be included in the TPV compositions for use in the conduits described herein in an amount of from 0.5 to 15 wt. %, or 0.5 to 10 wt. %, or 1 to 10 wt. %, or 1 to 5 wt. % by weight of the total thermoplastic vulcanizate composition, encompassing any value and subset therebetween. In some preferred embodiments, the compatibilizer may be included in the TPV compositions in the range of from 3 to 5 wt. % by weight of the total thermoplastic vulcanizate composition, encompassing any value and subset therebetween.

In the embodiments described herein, the TPV composition for use in the conduits of the present disclosure (e.g., flexible and/or steel conduits) may comprise a rubber component (e.g., a crosslinkable rubber component), a thermoplastic component, a curative, and a filler. Optionally, a compatibilizer may be included in the TPV compositions. As described above, in some embodiments, the rubber component is a crosslinked EPDM, IIR, BIIR, or BIMSM; the thermoplastic component is one or more of polypropylene and/or polyethylene; the plasticizer is paraffinic oil, polyisobutylene, and/or synthetic oil; and the filler is clay. The curative may be any curative described hereinabove, such as metal oxides, peroxides, phenolic resins, or hydrosiloxanes.

In most cases, the TPV composition used in the conduits described herein (e.g., as outer protective sheath or thermally insulating layer) comprises from about 30 to about 95 wt. % of the rubber component (i.e., the dispersed phase) and from about 5 to about 70 wt. % of the thermoplastic component (i.e., the continuous phase), both based on the total weight of the thermoplastic vulcanizate composition, and encompassing any value and subset therebetween.

The thermal conductivity of the TPV compositions described herein may be less than about 0.20 W/mK, such as in the range of 0.10 W/mK to 0.20 W/mK, encompassing any value and subset therebetween. In some embodiments, the TPV compositions have a thermal conductivity of less than 0.17 W/mK, or less than 0.16 W/mK, or less than 0.15 W/mK, or less than 0.14 W/mK.

In some embodiments, the thermally insulating layer has an abrasion resistance of less than about 3 wt. % in weight loss based on the total weight of the layer, including 0 wt. % in weight loss based on the total weight of the layer.

Production of Thermoplastic Vulcanizate

The TPV composition described herein may be produced by supplying the rubber component (e.g., crosslinkable rubber component), the thermoplastic component, the curative (e.g., phenolic resin curative), and any additional additives to a mixer, such as screw extruder, and then mixing the components under conditions such that the thermoplastic component melts and the rubber component is at least partially crosslinked to produce a heterogeneous product comprising particles of the at least partially crosslinked rubber component dispersed in a matrix comprising the thermoplastic component. Suitable conditions include a temperature from 170 to 250° C., such as from 190 to 230° C., encompassing any value and subset therebetween.

The TPV compositions of the present disclosure may be extruded, compression molded, blow molded, injection molded, and/or laminated into various shapes for use in the flexible conduits of the present disclosure, whether forming a single continuous layer or provided in discontinuous segments. Such shapes may include, but are not limited to, layers (e.g., extruded layers) of various thicknesses, tapes, strips, castings, moldings, and the like for providing an outer protective sheath and/or thermally insulating layer to the conduits described herein. In some embodiments, a TPV composition configured for use as at least a portion of a conduit may have a wall thickness (i.e., a layer thickness, where multiple layers may be used) in the range of from 0.5 millimeters (mm) to 150 mm, encompassing any value and subset therebetween. The particular thickness may depend on one or more factors, including the particular application requirement for the TPV composition as part of the conduit (e.g., whether it is provided in the outer protective layer or a thermally insulating layer).

Certain embodiments of the TPV compositions described herein are used to form articles made by extrusion and/or co-extrusion, blow molding, injection molding, thermoforming, elasto-welding, compression molding, 3D printing, pultrusion, and other suitable fabrication techniques. Certain embodiments of the present TPV compositions are used to form flexible pipes, tubing, hoses, and flexible structures, such as flexible subsea pipes, flow lines and flexible subsea umbilicals used in transporting fluids in petroleum production. The flexible structures can transport hydrocarbons extracted from an offshore deposit and/or can transport water, heated fluids, and/or chemicals injected into the formation in order to increase the production of hydrocarbons. Certain embodiments of the present TPV compositions are used to form the outer covering of a thermoplastic composite pipe.

Conduits

The conduits (i.e., pipes) described herein may comprise various layers, any of which may have a thermally insulating layer incorporated therewith, therebetween, and the like, anti-wear as well as an outer protective sheath. For example, flexible conduits may include polymeric, metallic, and composite layers, where a thermally insulating layer is located, for example, beneath the outer protective sheath. Steel conduits may include an outer protective layer that itself services as a thermally insulating layer (i.e., the outer protective layer and the thermally insulating layer are one and the same). In other instances, the steel conduit may be a pipe-in-pipe conduit (e.g., a first pipe is nested within a second pipe), the thermally insulating layer may be located in the annulus between the two pipes.

In some embodiments, a conduit may have the general structure shown in FIG. 1, having multiple layers. Inner tube 5 has a cannel or bore formed therethrough for the flow of hydrocarbons (e.g., oil and/or gas) and additional components therewith (e.g., water). The inner tube 5 may be made of a flexible material, including a helically wound flat or profiled metallic strips to provide collapse resistance, or alternatively may be composed of steel or other metal. In some instances, inner tube 5 may be composed of PVDF (e.g., for high temperature and pressure use), or crosslinked polyethylene and Nylon PA11 and/or Nylon PA12 (e.g., for mind temperature and pressure use), or HDPE (e.g., for low temperature and pressure use). Reinforcing layer 4 provides additional strength to the conduit, and may be made of any metal or layers of metals, or alternatively a reinforced polymer (e.g., carbon nanotube reinforced PVDF). Thermally insulating layer 3, as shown in FIG. 1, provides thermal insulation to the conduit and is composed of the TPV composition described herein (whereas, traditionally, it would be formed of syntactic polypropylene foam). As shown, thermally insulating layer 3 is located exterior to reinforcing layer 4. Alternatively or in addition, thermally insulating layer 3 may be located outer to inner tube 5 (e.g., between inner tube 5 and reinforcing layer 4), without departing from the scope of the present disclosure. Tensile layer 2 is optional, but if included in the conduit, provides resistance to tensile, torsional, and flexural stresses. Outer protective sheath 1 (or outer layer 1) prevents ingress of surrounding fluids (e.g., seawater) and protects against mechanical damage. Outer protective sheath 1 may be comprised of a polymeric material, such as HDPE, or may itself be a thermally insulating layer comprised of the TPV composition of the present disclosure.

Figure 2:
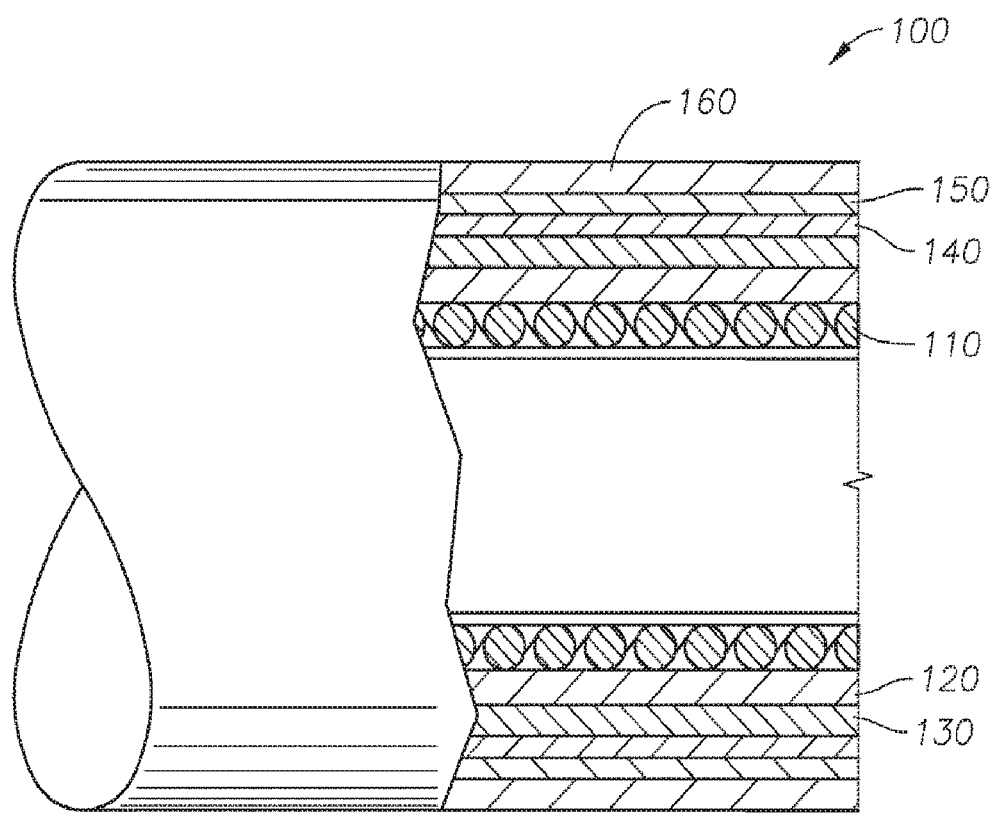
FIG. 2 is a view of a conduit according to one or more embodiments of the present disclosure.

Referring now to FIG. 2, illustrated is another conduit that may employ the TPV compositions of the present disclosure. As shown, conduit 100 (which as represented is a flexible conduit) comprises an inner tube 110 having a channel or bore formed therethrough. The tube 110 is made of a flexible material and includes a helically wound flat or profiled metallic strips to provide collapse resistance. A polymeric sheath 120 is at least partially disposed or wrapped around the tube 110 for containing the fluid in the pipe. The sheath 120 is preferably made of an impervious polymeric material. A layer 130 is at least partially disposed or wrapped around the layer 120 and provides resistance to internal pressure, hydrostatic collapse and crush. The layer 130 can be formed by helically wrapping a continuous metallic strip, preferably formed of carbon steel, with adjacent windings being interlocked, to form a flexible layer that provides significant hoop and axial strength, such as FLEXLOK™ (available from Wellstream Inc., Newcastle upon Tyne, United Kingdom). A tensile layer 140 is at least partially disposed or wrapped around the layer 130 and includes at least one tensile reinforcement element that is wound to resist the hoop stress, the axial component of the internal pressure, and the axial load due to the weight of the suspended pipe and exterior effects. A thermally insulating layer 150 surrounds the tensile layer 140, for example by extrusion, as is formed from the TPV composition described herein. An outer protective sheath 160 is at least partially disposed or otherwise formed over the outer tensile layer 150. The sheath 160 may be fabricated from the TPV composition described herein. In some embodiments, the thermally insulating layer 150 is the same or different composition as the outer protective sheath 160.

Although not shown in the drawings, one or more adhesive layers may be provided between any of the layers 110, 120, 130, 140, and 150 of FIG. 2 (or layers 1, 2, 3, 4, and 5 of FIG. 1).

In some embodiments, the present disclosure provides a conduit/pipe (e.g., a flexible conduit) of the type described above, in which the outer protective sheath or a thermally insulating layer comprises a thermoplastic vulcanizate (TPV) composition comprising: (i) a dispersed phase of one or more of an olefinic elastomeric copolymer rubber and a butyl rubber that has been at least partially cured by a curative and (ii) a continuous phase including at least one thermoplastic component. The rubber of the dispersed phase preferably comprises polypropylene and the at least one thermoplastic component of the continuous phase comprises isotactic polypropylene. In some embodiments, the at least one thermoplastic component of the continuous phase further comprises high density polyethylene and/or ultra-high molecular weight polyethylene. In one or more embodiments, the high density polyethylene comprising the thermoplastic component of the TPV may be characterized by having a $M_w$ of from about 50 to 1000 kg/mole, or from about 100 to 500 kg/mole, or from about 150 to 350 kg/mole, encompassing any value and subset therebetween. This high density polyethylene may be characterized by having a polydispersity index ($M_w/Mn$) that is less than 20, or less than 15, or less than 10, or less than 9. This high density polyethylene may be characterized by having a polydispersity index ($M_w/Mn$) that is higher than 2, or higher than 3, or higher than 5, or higher than 10.

In some embodiments of the present disclosure, the TPV composition comprises a butyl rubber component, such as IIR/BIIR, and/or BIMSM. Alternatively, the TPV composition comprises olefinic elastomeric copolymers, such as EPDM or an ethylene-α-olefin-vinyl norbornene rubber (alone or in combination with the butyl rubber). In some embodiments, the rubber component of the dispersed phase is non-halogenated and may be peroxide cured. In some embodiments, the continuous phase includes polypropylene and optionally also includes a polyamide.

The outer protective sheath and/or the thermally insulating layer formed from the TPV compositions described herein may be formed by extrusion onto the underlying layer, for example. The at least one reinforcing layer, or the inner tube, or the tensile layer. Generally, the outer protective sheath and/or thermally insulating layer is non-filled; that is, it does not contain hollow spheres of glass or other frangible material.

Certain embodiments of the present disclosure include (flexible) pipes/conduits comprising polymeric sheaths, comprising the TPV composition described herein, positioned as inner, intermediate, or outer layers of: 1) unbonded or bonded flexible pipes, tubes, and hoses similar to those described in API Spec 17J and API Spec 17K, 2) thermoplastic umbilical hoses similar to those described in API 17E, or 3) thermoplastic composite pipes similar to those described in DNV RP F119. In other embodiments, the present TPV composition is used in composite tapes (e.g., comprising carbon fibers, carbon nanotubes, or glass fibers embedded in a thermoplastic matrix) used in thermoplastic composite pipes similar to those described in DNV RP F119.

To facilitate a better understanding of the embodiments of the present invention, the following examples of preferred or representative embodiments are given. In no way should the following examples be read to limit, or to define, the scope of the disclosure.

EXAMPLES

For purposes of convenience, the various specific test procedures used in the examples described hereinbelow are identified in Table 1. It is to be understood that a person of ordinary skill in the art may use various other published or well-recognized test methods to determine a particular property of the TPV compositions described herein for use in a flexible or steel conduit, without departing from the scope of the present disclosure, although the specifically identified procedures are preferred. Each claim should be construed to cover the results of any of such procedures, even to the extent different procedures may yield different results or measurement values.

TABLE 1

| Property | Testing Method |
|---|---|
| Thermal Conductivity | ASTM C518 (using a FOX50-190 heat flow meter, TA Instruments, New Castle, DE) |
| Specific Gravity | ASTM D792 |
| Tensile Properties | ISO 37 and ISO 527 (above 50 D) |
| Hardness | ASTM D2240 |
| Surface Roughness | SURFTEST ™ SJ-500P Series Tester |
| Flexural Properties | ASTM D790 |
| Creep | Q800 Dynamic Mechanical Analysis Instrument, TA Instruments |

The examples hereinbelow are directed to TPV compositions for use in flexible or steel conduits as the outer protective sheath and/or one or more thermally insulating layers. The various TPV compositions of the examples herein were prepared using some or all of the components listed in Table 2.

TABLE 2

| Component | Function | Description |
|---|---|---|
| EXXPRO ™ 3745 (ExxonMobil Chemical Company, Houston, TX) | Rubber Component | Brominated Copolymer of Isobutylene and Paramethylstyrene |
| EXXPRO ™ 2244 (ExxonMobil Chemical Company, Houston, TX) | Rubber Component | Brominated Copolymer of Isobutylene and Isoprene |
| EXXPRO ™ 268 (ExxonMobil Chemical Company, Houston, TX) | Rubber Component | Copolymer of Isobutylene and Isoprene |
| EXXPRO ™ 1603 (ExxonMobil Chemical Company, Houston, TX) | Rubber Component | Brominated Copolymer of Isobutylene and Paramethylstyrene |
| EXXPRO ™ 3035 (ExxonMobil Chemical Company, Houston, TX) | Rubber Component | Brominated Copolymer of Isobutylene and Paramethylstyrene |
| ICECAP-K ™ (Burgess Pigment Company, Sandersville, GA) | Filler | Calcined Kaolin Clay |
| OPPANOL ™ N50 (BASF Corporation, Ludwigshafen, Germany) | Plasticizer | Solid Polyisobutene |
| Stannous Chloride | Curative Catalyst | N/A |
| Magnesium Oxide | Metal Oxide Curative | N/A |
| Zinc Oxide | Metal Oxide Curative | N/A |
| Stearic Acid | Curative | N/A |
| BRASKEM ™ F180 (Braskem, Philadelphia, PA) | Thermoplastic Component | High Melt Flow Rate Polypropylene Homopolymer |
| EXXONMOBIL ™ PP5341 (ExxonMobil Chemical Company, Houston, TX) | Thermoplastic Component | Fractional, Low Melt Flow Rate Polypropylene Homopolymer |
| EXXONMOBIL ™ Achieve ™ PP6282 (ExxonMobil Chemical Company, Houston, TX) | Thermoplastic Component | High Melt Strength Polypropylene Homopolymer |
| VISTAMAX ™ 6102 (ExxonMobil Chemical Company, Houston, TX) | Thermoplastic Component | Isotactic Propylene Repeat Units with Random Ethylene Distribution |
| SP-1045 Resin (Akrochem Corporation, Akron, OH) | Curative | Phenolic Resin |
| IRGANOX ™ 3114 (BASF Corporation, Ludwigshafen, Germany) | Antioxidant | Tris(3,5-DI-tert-butyl-4-hydroxybenzyl) isocyanurate |
| IRGAFOS ™ 168 | Antioxidant | Tris(2,4-DI-tert-butylphenyl) phosphite |
| TINUVIN ™ 622F (Ciba Specialty Chemicals, Basel, Switzerland) | Antioxidant and Stabilizer | Butanedioic acid |
| PARALUX ™ Oil 6001 (Chevron Corporation, San Ramon, CA) | Plasticizer | Paraffinic Oil |

TABLE 2-continued

| Component | Function | Description |
|---|---|---|
| INDOPOL ™ H-8 (INEOS Oligomers, League City, TX) | Plasticizer | Low Viscosity Liquid Polybutene |
| INDOPOL ™ H-100 (INEOS Oligomers, League City, TX) | Plasticizer | High Viscosity Liquid Polybutene |
| HRJ 16261 (SI Group, Inc., Schenectady, NY) | Curative | Phenolic Resin in Paraffinic Oil (RIO) |
| PARAMOUNT ™ 6001 (Chevron Corporation, San Ramon, CA) | Plasticizer | Paraffinic Oil |
| PAO 300 (ExxonMobil Chemical Company, Houston, TX) | Plasticizer | Polyalphaolefin oil |
| SG 2000 (Nippon Talc Co., Ltd., Osaka, Japan) | Filler | Talcum Powder |
| AEROSIL ™ 150 (Evonik Industries, Essen, Germany) | Filler | Fumed Silica |
| HUBERCARB ™ Q325 (Huber Engineered Materials, Atlanta, GA) | Filler | Calcium Carbonate |
| ZEOLUM ™ A-3 (Tosoh Corporation, Tokyo, Japan) | Filler | Zeolite |

Example 1

In this example, various properties of TPV compositions comprising butyl rubber were evaluated. The compositions of evaluated butyl-based TPV 1, 2, 3, 4, and 5 is provided in Table 3. The indicator "-" signifies that the particular component was not included in the TPV composition.

TABLE 3

| Component | TPV 1 | TPV 2 | TPV 3 | TPV 4 | TPV 5 |
|---|---|---|---|---|---|
| | PHR (per hundred rubber) | | | | |
| Exxpro 3745 | 100.00 | 100.00 | 100.00 | 100.00 | 100.00 |
| Icecap Clay | 10.00 | 10.00 | 10.00 | 10.00 | 10.00 |
| Oppanol N50 | — | — | — | — | 30.00 |
| Stannous Chloride | 1.30 | 1.30 | 1.30 | 1.30 | 2.00 |
| Magnesium Oxide | 2.00 | 2.00 | 2.00 | 2.00 | 0.30 |
| Zinc Oxide | 2.00 | 2.00 | 2.00 | 2.00 | 2.00 |
| Stearic Acid | 1.00 | 1.00 | 1.00 | 1.00 | 2.00 |
| Braskem F180A | 68.00 | — | — | — | — |
| PP5341 | — | 164.00 | 164.00 | 164.00 | 280.00 |
| Vistamax 6102 | — | — | — | — | 3.00 |
| Resin SP-1045 | 3.50 | 3.50 | 3.50 | 3.50 | 2.00 |
| Irganox 3114 | — | — | — | 1.00 | 1.00 |
| Irgafos 168 | — | — | — | 2.00 | 2.00 |
| Tinuvin 622F | — | — | — | 2.00 | 2.00 |
| Paralux oil | — | — | — | — | 12.00 |
| Indopol H-8 | 47.49 | 41.10 | 64.30 | 64.30 | — |
| Indopol H-100 | 16.81 | 23.2 | — | — | — |
| Total | 252.10 | 348.10 | 348.10 | 353.10 | 448.30 |

Each of the TPV compositions was injection molded into 3.2 mm thick plaques. Rectangular specimens were made in both crossflow and flow directions. The thermal conductivity of each of butyl-based TVP 1-5 was evaluated according to the method listed in Table 1 and compared to two comparative samples. The comparative samples included SANTOPRENE™ 203-50 thermoplastic vulcanizate (available from ExxonMobil Chemical Company, Houston, Tex.) and EXXONMOBIL™ PP5341, homopolymer polypropylene (available from ExxonMobil Chemical Company, Houston, Tex.). The thermal conductivity results are shown in Table 4.

TABLE 4

| TPV 1 | TPV 2 | TPV 3 | TPV 4 | TPV 5 | Santoprene ™ 203-50 | PP5341 |
|---|---|---|---|---|---|---|
| | | Thermal Conductivity (W/mK) | | | | |
| 0.13 | 0.14 | 0.14 | 0.14 | 0.16 | 0.19 | 0.21 |

As provided in Table 4, the butyl-based TPV compositions of the present disclosure surprisingly exhibit improved thermal conductivity compared to the two comparative examples (Santoprene™ 203-50 TPV and PP5341 polypropylene). Indeed, pure polypropylene exhibited the highest thermal conductivity, which may be due to higher crystallization. While the commercial Santoprene™ 203-50 TPV had a lower thermal conductivity compared to the PP5341 sample, it was still higher than any of the experimental samples TPV 1-5. TPV 1-4 each exhibited thermal conductivities less than currently used syntactic PP foam (at an initial thermal conductivity of 0.16 W/mK, which degrades overtime) and TPV 5 exhibited a thermal conductivity on par with the initial conductivity of syntactic PP foam. Accordingly, the TPV compositions of the present disclosure have surprisingly thermal conductivities that would beneficially increase heat resistance in flexible or steel conduits.

Various physical and mechanical properties were determined based on the methods listed in Table 1. The results are shown in Table 5. The unit MPa is megapascal; $T_c$ is crystallization temperature; Tm is melt temperature. Creep time was tested by applying a stress of 0.100 MPa was applied to the rectangular specimens with a dual cantilever fixture for twenty minutes at 20° C. and is reported in seconds (s) to achieve $10^{-8}$/Pa compliance by the DMA.

TABLE 5

| | TPV 1 | TPV 2 | TPV 3 | TPV 4 | TPV 5 |
|---|---|---|---|---|---|
| Specific Gravity | 0.947 | 0.937 | 0.931 | 0.933 | 0.931 |
| Surface Roughness (μm) | 91 | 75 | 87 | 56 | 24 |
| Hardness (Shore A or D) | 85.3 A | 32.5 D | 38.1 D | 39.1 D | 47.6 D |
| Tensile Strength at Break (MPa) | 8.7 | 16.9 | 16.4 | 16.2 | 18.9 |
| Elongation at Break (%) | 395 | 524 | 528 | 544 | 675 |
| 100% Tensile Modulus (MPa) | 4.6 | 10.2 | 9.8 | 9.6 | 14.7 |
| $T_c$ (° C.) | 108.4 | 108.1 | 107.8 | 110.1 | 111.0 |
| $T_m$ (° C.) | 158.5 | 158.1 | 156.9 | 156.8 | 159.8 |
| Creep (s) | 2 | $1.5 \times 10^3$ | $1.5 \times 10^3$ | $1.5 \times 10^3$ | $1.5 \times 10^5$ |

Tensile properties, 1% Seacant modulus and Young's modulus, were further tested at room temperature and at 90° C. for experimental butyl-based TPV samples TPV 1, TPV 2, and TPV 5. A comparative samples of SANTOPRENE™ 8201-90 thermoplastic vulcanizate (available from Exxon- Mobil Chemical Company, Houston, Tex.) was also tested. The results are show in Table 6.

TABLE 6

|  | Room Temperature | | 90° C. | |
|---|---|---|---|---|
|  | 1% Seacant Modulus (MPa) | Young's Modulus (MPa) | 1% Seacant Modulus (MPa) | Young's Modulus (MPa) |
| TPV 1 | 56.3 | 53.5 | 36.3 | 36.0 |
| TPV 2 | 217.6 | 214.3 | 134.6 | 134.4 |
| TPV 5 | 599.4 | 602.7 | 271.7 | 293.6 |
| Santoprene ™ 8201-90 | 127.4 | 122.0 | 70.6 | 83.5 |

As shown above, TPV 1 has a relatively lower hardness, which results in a lower tensile strength and related properties. Without being bound by theory, it is believed based on the results herein that the butyl rubber content of a TPV composition comprising butyl rubber affects thermal conductivity and physical properties of the resultant TPV.

Experimental butyl-based TPV samples TPV 1, TPV 2, and TPV 5 were further evaluated to determine the effect of polypropylene content on the TPV composition, and its resultant physical and mechanical properties (as shown in Table 3 above, each has a different amount of polypropylene content). Creep time was tested by applying a stress of 0.100 MPa was applied to the rectangular specimens with a dual cantilever fixture for twenty minutes at 20° C. and is reported in seconds (s) to achieve $10^{-8}$/Pa compliance by the DMA. The results are shown in Table 7.

TABLE 7

|  | TPV 1 | TPV 2 | TPV 5 |
|---|---|---|---|
| Polypropylene Content (%) | 27 | 47 | 62 |
| Thermal Conductivity at 25° C. (W/mK) | 0.135 | 0.144 | 0.156 |
| Creep (s) | 7 | $1.5 \times 10^3$ | $10^5$ |
| Hardness (Shore D) | 85 | 39 | 48 |
| 100% Tensile Modulus (MPa) | 5.0 | 9.6 | 14.7 |
| Elongation at Break (%) | 396 | 544 | 675 |
| Tensile Strength at Break (MPa) | 9.8 | 16.2 | 18.9 |
| Flexural Young's Modulus (MPa) | 53.5 | 214.3 | 602.7 |

Figure 3:
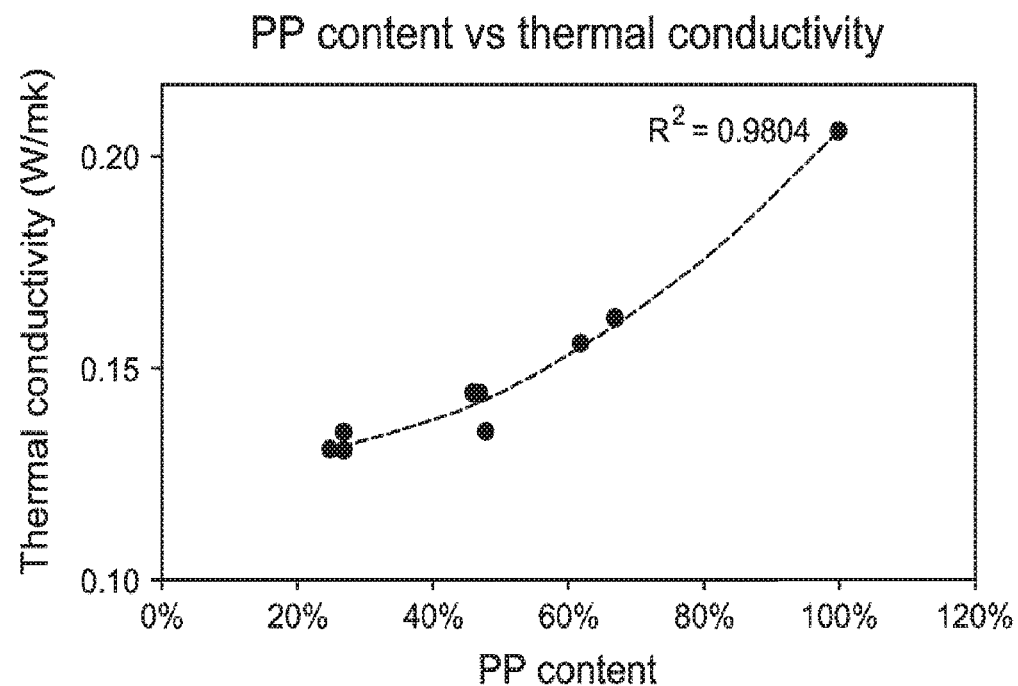
FIG. 3 is a graph showing a relationship between propylene content and thermal conductivity of TPV compositions according to one or more embodiments of the present disclosure.
Figure 4:
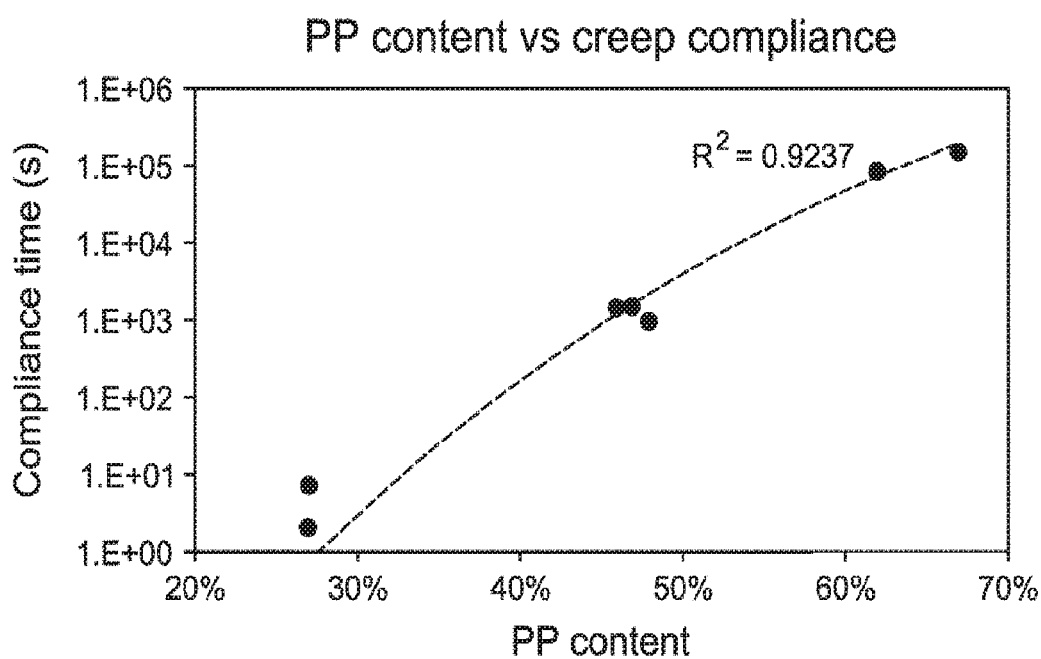
FIG. 4 is a graph showing a relationship between propylene content and creep time of TPV compositions according to one or more embodiments of the present disclosure.

As shown in Table 7, the higher the PP content, the higher the thermal conductivity, and therefore, less effective thermal insulation. However, creep improves with greater PP content. Without being bound by theory, it is believed that the thermoplastic component (e.g., polypropylene type and content) primarily contributes to creep, whereas the rubber component (e.g., butyl rubber) primarily contributes to thermal insulation. FIG. 3 is a graph showing the relationship between propylene content and thermal conductivity; FIG. 4 is a graph showing the relationship between propylene content and creep time.

Example 2

In this example, various properties of TPV compositions comprising butyl rubber were evaluated. The compositions of evaluated butyl-based TPV 6, 7, 8, 9, and 10 is provided in Table 8. The indicator "-" signifies that the particular component was not included in the TPV composition.

TABLE 8

| Component | TPV 6 | TPV 7 | TPV 8 | TPV 9 | TPV 10 |
|---|---|---|---|---|---|
|  | PHR (per hundred rubber) | | | | |
| Exxpro 3745 | 100.00 | 100.00 | 100.00 | 100.00 | 100.00 |
| Icecap Clay | 10.00 | 10.00 | 10.00 | 10.00 | 10.00 |
| Stannous Chloride | 1.30 | 1.30 | 1.30 | 1.30 | 2.00 |
| Magnesium Oxide | 2.00 | 2.00 | 2.00 | 2.00 | 0.30 |
| Zinc Oxide | 2.00 | 2.00 | 2.00 | 2.00 | 2.00 |
| Stearic Acid | 1.00 | 1.00 | 1.00 | 1.00 | 2.00 |
| Braskem F180A | 164.00 | — | — | — | — |
| PP5341 | — | 164.00 | — | 164.00 | 280.00 |
| PP 6282 | — | — | 164 | — | 3.00 |
| Resin SP-1045 | 3.50 | 3.50 | 3.50 | — | 2.00 |
| Indopol H100 | 64.3 | 64.3 | 64.3 | — | — |
| HRJ 16261 | — | — | — | 14 | — |
| Paramount 6001 | — | — | — | 54.5 | — |
| PAO 300 | — | — | — | — | 64.3 |
| Total | 348.1 | 348.1 | 348.1 | 348.8 | 348.1 |

Accordingly, TPV 6 comprises a high melt flow rate polypropylene homopolymer; TPV 7, TPV 9, and TPV 10 comprises a fractional, low melt flow rate polypropylene homopolymer; and TPV 8 comprises a high melt strength (HMS) polypropylene homopolymer. Various physical and mechanical properties of TPV 6, TPV 7, and TPV 8 were tested to evaluate the effect of the type of polypropylene on the TPV compositions. The results are provided in Table 9.

TABLE 9

|  | TPV 6 High Flow PP | TPV 7 Fractional PP | TPV 8 HMS PP |
|---|---|---|---|
| Thermal Conductivity at 25° C. (W/mK) | 0.145 | 0.147 | 0.148 |
| Hardness (Shore A) | 43 | 42 | 40 |
| 100% Tensile Modulus (MPa) | 9.8 | 10.0 | 8.9 |
| Elongation at Break (%) | 372 | 451 | 406 |
| Tensile Strength at Break (MPa) | 14.8 | 13.9 | 13.3 |
| Specific Gravity | 0.94 | 0.94 | 0.94 |
| Surface Roughness (μm) | 23.7 | 68.8 | 31.7 |

As shown, the thermal conductivity is comparable across the types of PP. The tensile strength at break is greatest for TPV 6 having the high melt flow rate PP, whereas the surface roughness of TPV 6 is the lowest compared to the other PP types.

The effect of plasticizer type on the physical and mechanical properties was additionally evaluated using TPV 9 and TPV 10, as well as TPV 2, TPV 3, and TPV 5 of Example 1. Creep time was tested by applying a stress of 0.100 MPa was applied to the rectangular specimens with a dual cantilever fixture for twenty minutes at 20° C. and is reported in seconds (s) to achieve $10^{-8}$/Pa compliance by the DMA.

The results are shown in Table 10. The indicator "-" signifies that the particular test was not performed.

TABLE 10

|  | TPV 2 High Viscosity PIB | TPV 3 Low Viscosity PIB | TPV 5 Solid PIB | TPV 9 Paraffinic Oil | TPV 10 PAO |
|---|---|---|---|---|---|
| Thermal Conductivity at 25° C. (W/mK) | 0.144 | 0.144 | 0.157 | 0.156 | 0.163 |
| Creep (s) | $1.5 \times 10^3$ | $1.5 \times 10^3$ | — | $10^5$ | — |
| Hardness (Shore D) | 32.5 | 38.1 | 41 | 48 | — |
| 100% Tensile Modulus (MPa) | 10.2 | 9.8 | 10.0 | 14.7 | — |
| Elongation at Break (%) | 524 | 528 | 319 | 675 | — |
| Tensile Strength at Break (MPa) | 16.9 | 16.4 | 14.0 | 18.9 | — |

As shown, generally lower thermal conductivity may be achieved using PIB, however suitable thermal conductivity is achieved regardless of the particular type of plasticizer used. It is further observed that TPV 2 and 3 exhibit lower thermal conductivity, but lower hardness compared to TPV 9 using paraffinic oil, although the same amount of polypropylene was included in each. Without being bound by theory, an increase in the relative amount of butyl rubber (or a decrease in the amount of polypropylene content) in TPV 9 would be expected to reduce hardness and lower the thermal conductivity such that it is on par with that of TPV 2 and TPV 2. A person skilled in the art can determine the proper type and concentration of plasticizer to achieve the desired range of thermal conductivity suitable for insulation application.

Example 3

In this example, various properties of TPV compositions comprising butyl rubber were evaluated. The compositions of evaluated butyl-based TPV 11, 12, 13, 14, and 15 is provided in Table 11. The indicator "-" signifies that the particular component was not included in the TPV composition.

TABLE 11

| Component | TPV 11 | TPV 12 | TPV 13 | TPV 14 | TPV 15 |
|---|---|---|---|---|---|
|  | PHR (per hundred rubber) | | | | |
| Exxpro 3745 | 100.00 | — | — | — | — |
| Exxpro 2244 | — | 100.00 | — | — | — |
| Exxpro 268 | — | — | 100.00 | — | — |
| Exxpro 1603 | — | — | — | 100.00 | — |
| Exxpro 3035 | — | — | — | — | 100.00 |
| PP5341 | 164.00 | 164.00 | 164.00 | 164.00 | 164.00 |
| Icecap-K | 10.00 | 10.00 | 10.00 | 10.00 | 10.00 |
| Stannous Chloride | 1.30 | 1.30 | 1.30 | 1.30 | 1.30 |
| Zinc Oxide | 2.00 | 2.00 | 2.00 | 2.00 | 2.00 |
| Magnesium Oxide | 2.00 | 2.00 | 2.00 | 2.00 | 2.00 |
| Stearic Acid | 1.00 | 1.00 | 1.00 | 1.00 | 1.00 |
| Resin SP-105 | 3.50 | 3.50 | 3.50 | 3.50 | 3.50 |
| Indopol H-100 | 64.3 | 64.3 | 64.3 | 64.3 | 64.3 |
| Total | 348.1 | 348.1 | 348.1 | 348.1 | 348.1 |

The effect of the selected rubber type on thermal conductivity was evaluated, and the results are shown in Table 12.

TABLE 12

| TPV 11 | TPV 13 | TPV 14 | TPV 15 |
|---|---|---|---|
| Thermal Conductivity at 25° C. (W/mK) | | | |
| 0.146 | 0.151 | 0.150 | 0.151 |

As shown, the thermal conductivities are relatively consistent across the TPV compositions.

Example 4

In this example, various properties of TPV compositions comprising butyl rubber were evaluated. The compositions of evaluated butyl-based TPV 16, 17, 18, 19, and 20 is provided in Table 13. The indicator "-" signifies that the particular component was not included in the TPV composition.

TABLE 13

| Component | TPV 16 | TPV 17 | TPV 18 | TPV 19 | TPV 20 |
|---|---|---|---|---|---|
|  | PHR (per hundred rubber) | | | | |
| Exxpro 3745 | 100.00 | 100.00 | 100.00 | 100.00 | 100.00 |
| PP5341 | 164.00 | 164.00 | 164.00 | 164.00 | 164.00 |
| SG 2000 | 10.00 | — | — | — | — |
| Icecap-K | — | 10 | — | — | — |
| Aerosil 150 | — | — | 10 | — | — |
| Hubercarb Q325 | — | — | — | 10 | — |
| Zeolum A-3 | — | — | — | — | 10 |
| Stannous Chloride | 1.30 | 1.30 | 1.30 | 1.30 | 1.30 |
| Zinc Oxide | 2.00 | 2.00 | 2.00 | 2.00 | 2.00 |
| Magnesium Oxide | 2.00 | 2.00 | 2.00 | 2.00 | 2.00 |
| Stearic Acid | 1.00 | 1.00 | 1.00 | 1.00 | 1.00 |
| Resin SP-1045 | 3.50 | 3.50 | 3.50 | 3.50 | 3.50 |
| Indopol H-100 | 64.3 | 64.3 | 64.3 | 64.3 | 64.3 |
| Total | 348.1 | 348.1 | 348.1 | 348.1 | 348.1 |

The effect of the selected filler on thermal conductivity was evaluated, and the results are shown in Table 14.

TABLE 14

| TPV 16 | TPV 17 | TPV 18 | TPV 19 | TPV 20 |
|---|---|---|---|---|
| Thermal Conductivity at 25° C. (W/mK) | | | | |
| 0.155 | 0.153 | 0.157 | 0.154 | 0.153 |

As shown, the thermal conductivities are relatively consistent across the TPV compositions, regardless of the particular filler selected.

Example 5

In this example, various properties of TPV compositions comprising butyl rubber were evaluated. The compositions of evaluated butyl-based TPV 21, 22, 23, and 25 is provided in Table 15. The indicator "-" signifies that the particular component was not included in the TPV composition.

TABLE 15

| Component | TPV 21 | TPV 22 | TPV 23 | TPV 24 |
|---|---|---|---|---|
|  | PHR (per hundred rubber) | | | |
| Exxpro 3745 | 100.00 | 100.00 | 100.00 | 100.00 |
| PP5341 | 164.00 | 164.00 | 164.00 | 164.00 |

TABLE 15-continued

| Component | TPV 21 | TPV 22 | TPV 23 | TPV 24 |
|---|---|---|---|---|
| | PHR (per hundred rubber) | | | |
| Icecap-K | 0 | 20 | 30 | 40 |
| Stannous Chloride | 1.30 | 1.30 | 1.30 | 1.30 |
| Zinc Oxide | 2.00 | 2.00 | 2.00 | 2.00 |
| Magnesium Oxide | 2.00 | 2.00 | 2.00 | 2.00 |
| Stearic Acid | 1.00 | 1.00 | 1.00 | 1.00 |
| Resin SP-1045 | 3.50 | 3.50 | 3.50 | 3.50 |
| Indopol H-100 | 64.3 | 64.3 | 64.3 | 64.3 |
| Total | 338.1 | 358.1 | 368.1 | 378.1 |

The effect of the amount of filler on thermal conductivity was evaluated, and the results are shown in Table 16. TPV 17 having 10 phr of filler from Example 4 is also included in Table 16 for comparison.

TABLE 16

| TPV 21 | TPV 17 | TPV 22 | TPV 23 | TPV 24 |
|---|---|---|---|---|
| Thermal Conductivity at 25° C. (W/mK) | | | | |
| 0.153 | 0.153 | 0.155 | 0.159 | 0.165 |

As shown, the thermal conductivities appear to increase between 10 and 20 phr of filler. As the filler increases in concentration, the thermal conductivity increases, thus reducing thermal insulation.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention. All documents described herein are incorporated by reference herein, including any priority documents and/or testing procedures to the extent they are not inconsistent with this text. Likewise, the term "comprising" is considered synonymous with the term "including," and whenever a composition, an element or a group of elements is preceded with the transitional phrase "comprising", it is understood that we also contemplate the same composition or group of elements with transitional phrases "consisting essentially of," "consisting of", "selected from the group consisting of," or "is" preceding the recitation of the composition, element, or elements and vice versa.

The invention claimed is:

1. A flexible conduit comprising:
    (a) an inner housing;
    (b) at least one reinforcing layer at least partially disposed around the inner housing;
    (c) an outer protective sheath at least partially disposed around the at least one reinforcing layer; and
    (d) a thermally insulating layer disposed between the at least one reinforcing layer and the outer protective sheath,
    wherein the thermally insulating layer comprises a thermoplastic vulcanizate composition comprising: (i) a dispersed phase of an at least partially cured rubber comprising repeating units derived from at least one $C_4$ to $C_7$ isomonoolefin monomer and (ii) a continuous phase including at least one thermoplastic polymer.

2. The flexible conduit of claim 1, wherein the at least partially cured rubber of the dispersed phase comprises repeating units derived from at least one $C_4$ to $C_7$ multiolefin monomer.

3. The flexible conduit of claim 1, wherein the at least partially cured rubber comprises units derived from isobutene and units derived from paramethyl-styrene.

4. The flexible conduit of claim 2, wherein the isomonoolefin comprises isobutene and the multiolefin comprises isoprene.

5. The flexible conduit of claim 1, wherein the rubber of the dispersed phase is halogenated.

6. The flexible conduit of claim 5, wherein the rubber is halogenated with bromine or chloride.

7. The flexible conduit of claim 1, wherein the rubber of the dispersed phase is non-halogenated.

8. The flexible conduit of claim 1, wherein the rubber of the dispersed phase is cured with a curing agent selected from at least one of peroxides, phenolic curatives, moisture curatives, hydrosilylation curatives, silane-based curatives, and combinations thereof.

9. The flexible conduit of claim 1, wherein the continuous phase includes at least one of polypropylene, polyethylene, and combinations thereof.

10. The flexible conduit of claim 1, wherein the continuous phase includes a polyamide.

11. The flexible conduit of claim 1, wherein the thermoplastic vulcanizate composition comprises from about 30% to about 95% of the dispersed phase (i) based on the total weight of the thermoplastic vulcanizate composition.

12. The flexible conduit of claim 1, wherein the thermoplastic vulcanizate composition comprises from about 5% to about 70% of the continuous phase (ii) based on the total weight of the thermoplastic vulcanizate composition.

13. The flexible conduit of claim 1, wherein the thermally insulating layer further comprises a filler.

14. The flexible conduit of claim 1, wherein the thermally insulating layer has at least one of the following properties:
    (i) a thermal conductivity in the range from about 0.10 to about 0.20 W/(m–K); and
    (ii) an abrasion resistance of less than about 3% in weight loss based on the total weight of the layer.

15. The flexible conduit of claim 1, wherein the outer protective sheath comprises a second thermoplastic vulcanizate composition that is the same as the thermally insulating layer.

16. The flexible conduit of claim 1, wherein the outer protective sheath comprises a second thermoplastic vulcanizate composition comprising (i) a dispersed phase of an ethylene-α-olefin-vinyl norbornene rubber that has been at least partially cured by hydrosilylation and (ii) a continuous phase including at least one second thermoplastic polymer.

17. The flexible conduit of claim 1, wherein the outer protective sheath comprises a second thermoplastic vulcanizate composition and flexible conduit are in accordance with at least one of API Spec 17J, API Spec 17K, and DNV RP F119.

18. The flexible conduit of claim 1, wherein the thermally insulating layer and flexible conduit are in accordance with at least one of API Spec 17J, API Spec 17K, and DNV RP F119.

19. The flexible conduit of claim 1, wherein the rubber of the dispersed phase is cured with a phenolic resin.

20. The flexible conduit of claim 19, wherein the phenolic resin is a phenolic resin in oil.

21. The flexible conduit of claim 1, wherein the thermoplastic vulcanizate composition comprises at least one oil.

22. The flexible conduit of claim 21, wherein the at least one oil is at least one of a paraffinic oil, a polyisobutylene, and combinations thereof.

23. The flexible conduit of claim 22, wherein the polyisobutylene has a number average molecular weight ($M_n$) of less than 10,000 g/mol.

24. The flexible conduit of claim 1, wherein the thermoplastic vulcanizate composition has a hardness in the range of 60 Shore A to 60 Shore D.

25. The flexible conduit of claim 1, wherein the thermoplastic vulcanizate composition has a creep time of greater than 500 seconds.

* * * * *